US012406637B2

(12) United States Patent
Ma et al.

(10) Patent No.: US 12,406,637 B2
(45) Date of Patent: Sep. 2, 2025

(54) DISPLAY APPARATUS AND DRIVING METHOD THEREFOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Wenpeng Ma, Beijing (CN); Yinlong Zhang, Beijing (CN); Shulin Yao, Beijing (CN); Yingmeng Miao, Beijing (CN); Pengfei Hu, Beijing (CN); Yuhang Tian, Beijing (CN); Zheng Zhang, Beijing (CN); Yanping Liao, Beijing (CN); Dongchuan Chen, Beijing (CN); Jiantao Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/578,310

(22) PCT Filed: Jul. 27, 2022

(86) PCT No.: PCT/CN2022/108310
§ 371 (c)(1),
(2) Date: Jan. 11, 2024

(87) PCT Pub. No.: WO2023/020227
PCT Pub. Date: Feb. 23, 2023

(65) Prior Publication Data

US 2024/0321230 A1 Sep. 26, 2024

(30) Foreign Application Priority Data

Aug. 18, 2021 (CN) ........................ 202110948612.3

(51) Int. Cl.
*G09G 3/36* (2006.01)

(52) U.S. Cl.
CPC ......... *G09G 3/3677* (2013.01); *G09G 3/3688* (2013.01); *G09G 2310/0286* (2013.01); *G09G 2310/08* (2013.01); *G09G 2340/0435* (2013.01)

(58) Field of Classification Search
CPC ...... G06F 3/041–047; G06F 2203/041–04114; G09G 3/3614;
(Continued)

(56) References Cited

U.S. PATENT DOCUMENTS

2017/0178557 A1* 6/2017 Li ........................ G09G 3/3266
2020/0152128 A1* 5/2020 Kim ..................... G09G 3/3266
2022/0036814 A1* 2/2022 Hwang ................ G09G 3/3233

FOREIGN PATENT DOCUMENTS

CN 101614922 A 12/2009
CN 103208250 A 7/2013
(Continued)

OTHER PUBLICATIONS

The First Office Action mailed Apr. 14, 2025, in Chinese Application No. 202110948612.3, 18 pages including English translation.

*Primary Examiner* — Sanjiv D. Patel
(74) *Attorney, Agent, or Firm* — XSENSUS LLP

(57) ABSTRACT

A display apparatus includes sub-pixels, at least one gate line group and a scan drive circuit. The gate line group includes a first gate line, a second gate line and a third gate line. The scan drive circuit outputs, in a frame scan cycle, a first scan signal to the first gate line, a second scan signal to the second gate line, and a third scan signal to the third gate line in sequence. Durations of effective scan periods of the scan signals are equal. A start moment of the effective scan period of the second scan signal is delayed by a first time length compared with that of the first scan signal. A start
(Continued)

moment of the effective scan period of the third scan signal is delayed by a second time length less than the first time length compared with that of the second scan signal.

18 Claims, 11 Drawing Sheets

(58) Field of Classification Search
CPC ....... G09G 2310/08; G09G 2310/0251; G09G 2310/0205; G09G 2310/0267; G09G 2310/0216; G09G 2310/0213; G09G 3/3266; G09G 2310/062; G09G 3/3659
See application file for complete search history.

(56) References Cited

FOREIGN PATENT DOCUMENTS

| | | | |
|---|---|---|---|
| CN | 103236244 | A | 8/2013 |
| CN | 104978944 | A | 10/2015 |
| CN | 107068101 | A | 8/2017 |
| CN | 107731150 | A | 2/2018 |
| CN | 110969976 | A | 4/2020 |
| JP | 2012083444 | A | 4/2012 |
| KR | 20080000916 | A | 1/2008 |

* cited by examiner

DISPLAY APPARATUS AND DRIVING METHOD THEREFOR

CROSS-REFERENCE TO RELATED APPLICATIONS

This application is a national phase entry under 35 USC 371 of International Patent Application No. PCT/CN2022/108310 filed on Jul. 27, 2022, which claims priority to Chinese Patent Application No. 202110948612.3, filed on Aug. 18, 2021, which are incorporated herein by reference in their entirety.

TECHNICAL FIELD

The present disclosure relates to the field of display technologies, and in particular, to a display apparatus and a driving method therefor.

BACKGROUND

Liquid crystal display (LCD) apparatuses have begun to be widespread and have gradually become mainstream products due to their small size, low power consumption, lack of radiation, and high display resolution.

SUMMARY

In an aspect, a display apparatus is provided. The display apparatus includes a plurality of sub-pixels, at least one gate line group and a scan drive circuit. The plurality of sub-pixels are arranged in an array. The gate line group includes multiple gate lines, and the multiple gate lines include a first gate line, a second gate line and a third gate line that are arranged sequentially along a column direction of the array. The scan drive circuit is coupled to the multiple gate lines in the gate line group, and is configured to, in a frame scan cycle, respectively output scan signals to the multiple gate lines in the gate line group, which includes: outputting a first scan signal to the first gate line, outputting a second scan signal to the second gate line, and outputting a third scan signal to the third gate line in sequence. A duration of an effective scan period of the first scan signal, a duration of an effective scan period of the second scan signal, and a duration of an effective scan period of the third scan signal are equal; and a start moment of the effective scan period of the second scan signal is delayed by a first time length compared with a start moment of the effective scan period of the first scan signal, and a start moment of the effective scan period of the third scan signal is delayed by a second time length compared with the start moment of the effective scan period of the second scan signal. The second time length is less than the first time length.

In some embodiments, the second time length is zero.

In some embodiments, the second time length is greater than 0 and less than or equal to ½ of the first time length.

In some embodiments, for scan signals respectively output by the scan drive circuit to any two adjacent gate lines in the gate line group, respective effective scan periods at least partially overlap with each other.

In some embodiments, the gate line group further includes a fourth gate line arranged adjacent to the third gate line along the column direction. The scan drive circuit is further configured to output a fourth scan signal to the fourth gate line; a duration of an effective scan period of the fourth scan signal is equal to the duration of the effective scan period of the third scan signal, a start moment of the effective scan period of the fourth scan signal is delayed by a third time length compared with the start moment of the effective scan period of the third scan signal, and the third time length is equal to the first time length.

In some embodiments, for the first scan signal and the fourth scan signal output by the scan drive circuit to the gate line group, respective effective scan periods at least partially overlap with each other.

In some embodiments, the at least one gate line group includes a first gate line group and a second gate line group that are arranged adjacent to each other along the column direction. A start moment of an effective scan period of a first scan signal output from a first gate line in the second gate line group is delayed by a fourth time length compared with a start moment of an effective scan period of a fourth scan signal output from a fourth gate line in the first gate line group. The fourth time length is equal to the first time length.

In some embodiments, the display apparatus further includes a data drive circuit and a plurality of data lines. The data drive circuit is coupled to the plurality of data lines and is configured to respectively output data signals to the plurality of data lines, a data line is configured to write a data signal to a sub-pixel, and the data signal is pixel data for the sub-pixel. The plurality of data lines include representative data lines. Multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line. The second sub-pixel and the third sub-pixel have a same color. The data drive circuit is configured to, in the frame scan cycle, write a first data signal to the first sub-pixel through the representative data line, and simultaneously write a second data signal or a third data signal to the second sub-pixel and the third sub-pixel through the representative data line; and the first data signal is a data signal corresponding to pixel data for the first sub-pixel, the second data signal is a data signal corresponding to pixel data for the second sub-pixel, and the third data signal is a data signal corresponding to pixel data for the third sub-pixel.

In some embodiments, in the frame scan cycle, the second time length is zero. The data drive circuit is configured to, in the frame scan cycle, simultaneously write the second data signal to the second sub-pixel and the third sub-pixel through the representative data line. The second data signal lasts for a time length equal to the first time length. A start moment of the second data signal is delayed by a fifth time length compared with the start moment of the effective scan period of the second scan signal. The fifth time length is 2 times the first time length.

In some embodiments, in the frame scan cycle, the second time length is zero. The data drive circuit is configured to, in the frame scan cycle, simultaneously write the third data signal to the second sub-pixel and the third sub-pixel through the representative data line. The third data signal lasts for a time length equal to the first time length. A start moment of the third data signal is delayed by a fifth time length compared with the start moment of the effective scan period of the second scan signal. The fifth time length is 2 times the first time length.

In some embodiments, the second time length is greater than 0 and less than or equal to ½ of the first time length. The data drive circuit is configured to, in an odd-numbered frame scan cycle, write the first data signal to the first sub-pixel through the representative data line, and simultaneously write the second data signal to the second sub-pixel and the third sub-pixel through the representative data line; and an end moment of the second data signal is preceded by a sixth time length compared with an end moment of the effective scan period of the third scan signal. The data drive circuit is configured to, in an even-numbered frame scan cycle, write the first data signal to the first sub-pixel through the representative data line, and simultaneously write the third data signal to the second sub-pixel and the third sub-pixel through the representative data line; and an end moment of the third data signal is delayed by a seventh time length compared with an end moment of the effective scan period of the second scan signal. The second data signal and the third data signal both last for a time length equal to the first time length. The sixth time length and the seventh time length are both greater than 0.

In some embodiments, the second time length is greater than 0 and less than or equal to ½ of the first time length. The data drive circuit is configured to, in an odd-numbered frame scan cycle, write the first data signal to the first sub-pixel through the representative data line, and simultaneously write the third data signal to the second sub-pixel and the third sub-pixel through the representative data line; and an end moment of the third data signal is delayed by a seventh time length compared with an end moment of the effective scan period of the second scan signal. The data drive circuit is configured to, in an even-numbered frame scan cycle, write the first data signal to the first sub-pixel through the representative data line, and simultaneously write the second data signal to the second sub-pixel and the third sub-pixel through the representative data line; and an end moment of the second data signal is preceded by a sixth time length compared with an end moment of the effective scan period of the third scan signal. The second data signal and the third data signal both last for a time length equal to the first time length. The sixth time length and the seventh time length are both greater than 0.

In some embodiments, the second time length is equal to ½ of the first time length. The sixth time length and the seventh time length are both ½ of the first time length. In the odd-numbered frame scan cycle, a start moment of the second data signal is delayed by an eighth time length compared with the start moment of the effective scan period of the second scan signal. In the even-numbered frame scan cycle, a start moment of the third data signal is delayed by a ninth time length compared with the start moment of the effective scan period of the third scan signal. The eighth time length and the ninth time length are both 2 times the first time length.

In some embodiments, for scan signals respectively output by the scan drive circuit to any two adjacent gate lines in the gate line group, respective effective scan periods at least partially overlap with each other. Any two adjacent gate lines in the first gate line group are divided into a preceding gate line and a subsequent gate line, and the preceding gate line is arranged at a side of the subsequent gate line facing the data drive circuit. Data signals respectively written to sub-pixels coupled to the preceding gate line each last for a time length partially overlapping with an effective scan period of a scan signal output by the scan drive circuit to the subsequent gate line.

In some embodiments, the plurality of data lines include first data lines and second data lines that are alternately distributed along a row direction intersecting the column direction. In the frame scan cycle, the data drive circuit is configured to, output a first type of data signal to the first data lines and a second type of data signal to the second data lines. The first type of data signal and the second type of data signal have different polarities.

In some embodiments, a data line is coupled to two sub-pixels in a same row, and the two sub-pixels coupled to the data line are respectively coupled to different gate lines.

In some embodiments, the display apparatus further includes a timing control circuit, coupled to the scan drive circuit and configured to output multiple clock signals to the scan drive circuit. The scan drive circuit is further configured to, according to the multiple clock signals, respectively output the scan signals to the multiple gate lines.

In another aspect, a driving method for a display apparatus is provided. The display apparatus is as described in any of the above embodiments. The driving method includes: in the frame scan cycle, respectively outputting, by the scan drive circuit, the scan signals to the multiple gate lines in the gate line group, which includes: outputting the first scan signal to the first gate line, outputting the second scan signal to the second gate line, and outputting the third scan signal to the third gate line in sequence. The duration of the effective scan period of the first scan signal, the duration of the effective scan period of the second scan signal, and the duration of the effective scan period of the third scan signal are equal; and the start moment of the effective scan period of the second scan signal is delayed by the first time length compared with the start moment of the effective scan period of the first scan signal, and the start moment of the effective scan period of the third scan signal is delayed by the second time length compared with the start moment of the effective scan period of the second scan signal. The second time length is less than the first time length.

In some embodiments, the display apparatus further includes a data drive circuit and a plurality of data lines. The data drive circuit is coupled to the plurality of data lines. The driving method further includes: respectively outputting, by the data drive circuit, data signals to the plurality of data lines, and writing, by a data line, a data signal to a sub-pixel, and the data signal is pixel data for the sub-pixel. The plurality of data lines include representative data lines. Multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line. The second sub-pixel and the third sub-pixel have a same color. The driving method further includes: in the frame scan cycle, writing, by the data drive circuit, a first data signal to the first sub-pixel through the representative data line, and simultaneously writing, by the data drive circuit, a second data signal or a third data signal to the second sub-pixel and the third sub-pixel through the representative data line. The first data signal is a data signal corresponding to pixel data for the first sub-pixel, the second data signal is a data signal corresponding to pixel data for the second sub-pixel, and the third data signal is a data signal corresponding to pixel data for the third sub-pixel.

In some embodiments, the plurality of data lines include a first data line and a second data line arranged adjacent to each other along a row direction intersecting the column direction. The driving method further includes: in the frame scan cycle, outputting, by the data drive circuit, a first type of data signal to the first data line and a second type of data signal to the second data line. The first type of data signal and the second type of data signal have different polarities.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
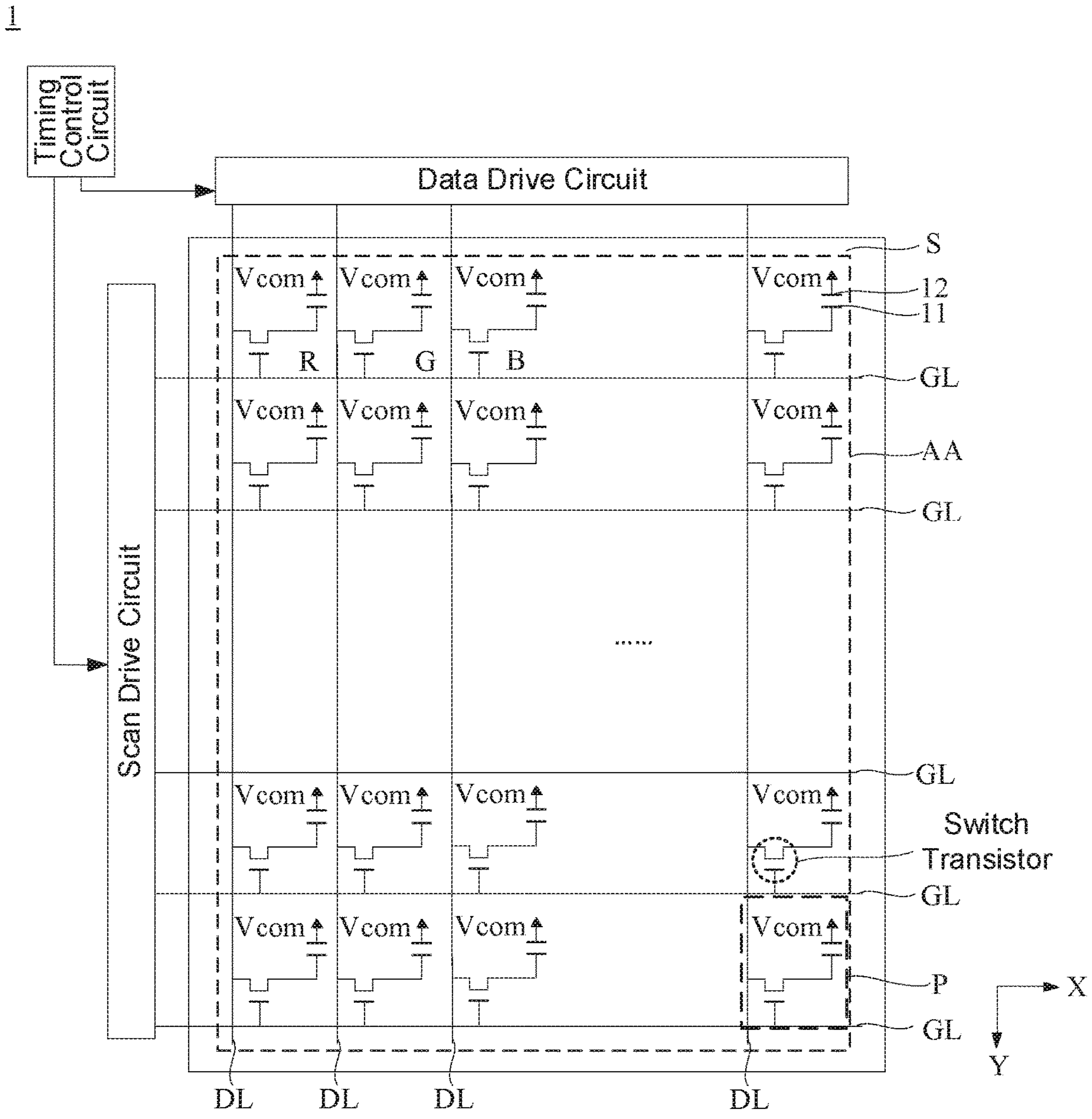
FIG. 1 is a structural diagram of a display apparatus, in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to." In the description of the specification, terms such as "one embodiment", "some embodiments", "exemplary embodiments," "example," "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled," "connected" and their derivatives. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "applicable to" or "configured to" used herein means an open and inclusive expression, which does not exclude devices that are applicable to or configured to perform additional tasks or steps. In addition, the phrase "based on" used is meant to be open and inclusive, since a process, step, calculation or other action that is "based on" one or more of the stated conditions or values may, in practice, be based on additional conditions or values exceeding those stated.

Exemplary embodiments are described herein with reference to sectional views and/or plan views as idealized exemplary drawings. In the drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

A liquid crystal display apparatus includes a plurality of gate lines and a plurality of data lines, and a plurality of sub-pixels defined by intersections of the plurality of gate lines and the plurality of data lines. Each sub-pixel is coupled to a gate line and a data line, in which the gate line is configured to transmit a scan signal to the sub-pixel coupled thereto, and the data line is configured to transmit a data signal to the sub-pixel coupled thereto. The liquid crystal display apparatus further includes a plurality of switch transistors (e.g., thin film transistors, TFT for short), each switch transistor is arranged corresponding to a sub-pixel.

The liquid crystal display apparatus normally implements image display using a row-by-row scanning mode. When the row-by-row scanning is performed, a gate line at the first row outputs a scan signal to multiple sub-pixels coupled thereto, so that switch transistors for the multiple sub-pixels are in a turn-on state, and the data lines output data signals to the multiple sub-pixels at the first row. Afterwards, a gate line at the second row outputs a scan signal to multiple sub-pixels coupled thereto, while the outputting of the scan signal for the first row stops, the data lines output data signals to the multiple sub-pixels at the second row, and so on.

With the development of liquid crystal display technologies, the requirements for the display effect of liquid crystal display apparatuses are getting higher and higher. The larger the refresh frequency of the liquid crystal display apparatuses are capable of achieving, the smaller the degree of flickering of the displayed image is, and the higher the graphics quality of the displayed image is. Therefore, how to increase the refresh frequency of the liquid crystal display apparatuses has become an urgent problem to be solved.

To solve this problem, some embodiments of the present disclosure provide a display apparatus. The display apparatus is configured to display images, such as still images or dynamic images. Exemplarily, the display apparatus may be a liquid crystal display panel, or may be a product including a liquid crystal display panel and drive circuits (the drive circuits are coupled to the liquid crystal display panel and configured to drive the liquid crystal display panel to display images). Exemplarily, the liquid crystal display panel may be an advanced super dimension switch (AD-SDS) mode liquid crystal display panel, or an in-plane switch (IPS) mode liquid crystal display panel.

Liquid crystal molecules only modulate light and cannot emit light themselves. In order to achieve image display, the product may further include, for example, a backlight module provided on a back side of the liquid crystal display panel (the side facing away from a display surface), and the backlight module is configured to provide backlight to the liquid crystal display panel. The type of the backlight module is not specifically limited, for example, the backlight module may be an edge-type backlight module or a direct-type backlight module.

Exemplarily, the product may be: a display, a television, a billboard, a digital photo frame, a laser printer having a display function, a telephone, a mobile phone, a personal digital assistant (PDA), a digital camera, a portable camcorder, a viewfinder, a navigator, a vehicle-mounted display apparatus, a tiled display apparatus, a household appliance, an information inquiry device (e.g., a business inquiry device of departments such as an e-government department, a bank, a hospital and an electric power department), a monitor, or the like.

In some embodiments of the present disclosure, referring to FIG. 1, the display apparatus 1 has a display area (active area, AA for short) and a peripheral area S. The peripheral area S is located on at least one side of the display area AA. Exemplarily, the peripheral area S may be arranged around the display area AA. The display apparatus 1 may include a plurality of sub-pixels P. Each switch transistor is arranged corresponding to a sub-pixel P. The plurality of sub-pixels P are located in the AA area and arranged in an array along a row direction and a column direction. Exemplarily, sub-pixels P arranged in a line along the row direction are referred to as sub-pixels in the same row, and sub-pixels P arranged in a line along the column direction are referred to as sub-pixels in the same column. Here, the row direction is represented by X, and the column direction is represented by Y.

Exemplarily, each row of sub-pixels includes multiple sub-pixels of a first color, multiple sub-pixels of a second color and multiple sub-pixels of a third color. The first color, the second color and the third color are not limited, which may be three primary colors or other colors. For example, the first color, the second color and the third color are blue, green and red, respectively. That is, referring to FIG. 1, the plurality of sub-pixels include blue sub-pixels B, green sub-pixels G and red sub-pixels R.

With continued reference to FIG. 1, each sub-pixel P may include a pixel electrode 11 and a common electrode 12, and an electric field formed between the two is applied to liquid crystal molecules at a position corresponding to the sub-pixel P such that the liquid crystal molecules corresponding to the sub-pixel P are arranged in a corresponding mode, so as to control the brightness of the light emitted from the sub-pixel P. In the embodiments of the present disclosure, specific shapes of the pixel electrode 11 and the common electrode 12, and the arrangement of the relative positions are not specifically limited. For example, the pixel electrode 11 and the common electrode 12 may each include multiple electrode strips that are interconnected and have gaps between each other, and the electrode strips belonging to the pixel electrode 11 and the electrode strips belonging to the common electrode 12 are alternately arranged. Alternatively, of the pixel electrode 11 and the common electrode 12, one includes multiple electrode strips that are interconnected and have gaps between each other, and the other is a flat electrode. The pixel electrode 11 and the common electrode 12 may be arranged in the same layer or different layers.

In some embodiments of the present disclosure, referring to FIG. 1, similar to the above, the display apparatus 1 includes a plurality of gate lines GL and a plurality of data lines DL, and each sub-pixel is coupled to a gate line GL and a data line DL. The display apparatus 1 further includes a scan drive circuit (Scan Drive IC (integrated circuit)), a data drive circuit (Data Drive IC (integrated circuit)), and a timing control circuit (TCON IC (integrated circuit)) coupled to both the scan drive circuit and the data drive circuit. The timing control circuit is configured to, convert data signals and control signals received from an external interface into control signals suitable for the data drive circuit and the scan drive circuit, output control signals such as RGB control signals to the data drive circuit, and output control signals such as multiple clock signals to the scan drive circuit, so as to realize image display of the display apparatus. The scan drive circuit may also be referred to as a gate drive circuit (Gate Drive IC) or a column drive circuit (Row Drive IC). The scan drive circuit is coupled to the plurality of gate lines GL. In a frame scan cycle, the scan drive circuit is configured to, according to the multiple clock signals provided by the timing control circuit, respectively output scan signals to the plurality of gate lines GL. Each of the plurality of gate lines GL is configured to transmit a scan signal to multiple sub-pixels P coupled thereto to control the turning on and turning off of switch transistors for the sub-pixels P. The data drive circuit may also be referred to as a source drive circuit (Source Drive IC) or a column drive circuit (Column Drive IC). The data drive circuit is coupled to the plurality of data lines DL, and is configured to respectively output data signals to the plurality of data lines DL after the switch transistors are turned on. Each data line DL is configured to write a data signal to at least one (e.g., one or more) sub-pixel P coupled thereto, where the data signal is pixel data for the sub-pixel P (i.e., a voltage value enabling the sub-pixel to display a preset gray scale). A process of writing a data signal to a sub-pixel P is a charging process of a load capacitor formed by a pixel electrode 11 and a common electrode 12 in the sub-pixel P. After the charging is completed, a voltage of the load capacitor is a gray scale voltage, and the gray scale voltage is sub-pixel data for the sub-pixel P.

Figure 2:
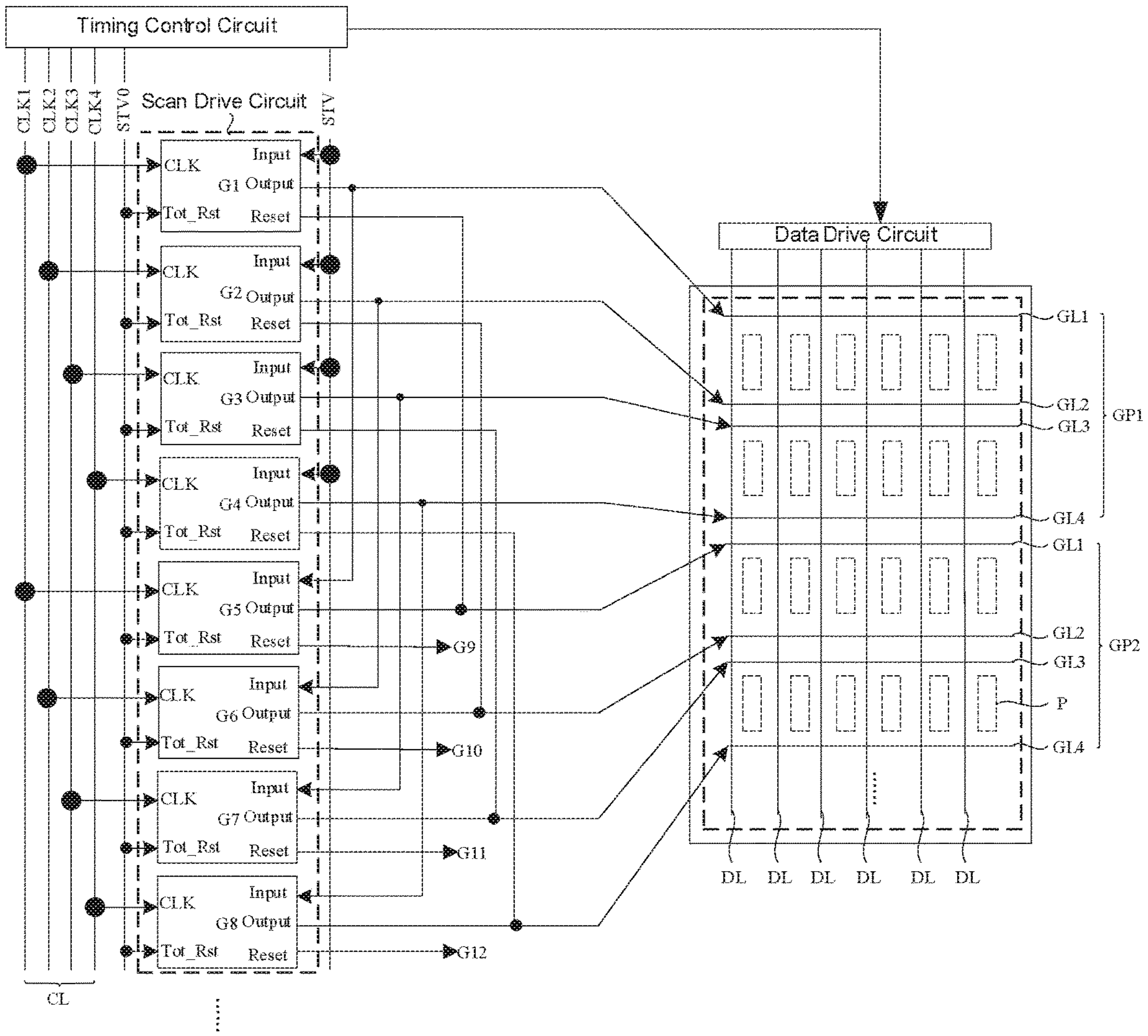
FIG. 2 is a structural diagram of a display apparatus, in accordance with some other embodiments.

Exemplarily, referring to FIG. 2, the scan drive circuit includes a plurality of rows of gate driver on array (GOA) units cascaded, which are G1, G2, G3, G4 . . . G(n−1), Gn. Each of the plurality of rows of GOA units cascaded is coupled to a corresponding gate line GL, thereby realizing the row-by-row scanning of the gate lines GL. Exemplarily, each GOA unit may include a signal input terminal Input, a signal output terminal Output, a reset signal terminal Reset, a clock signal terminal CLK, a frame reset signal terminal Tot-Rst, etc. The signal output terminal Output is coupled to the corresponding gate line GL. The timing control circuit can input a frame reset signal STV0 to frame reset signal terminals Tot-Rst of the plurality of GOA units through corresponding signal lines to reset the plurality of GOA units before the start of each frame scan cycle. The frame reset signal STV0 can reset the plurality of GOA units, thereby preventing signals input to each GOA unit in the previous frame scan cycle from causing interference to signals received by the GOA unit in the next frame scan cycle, and eliminating possible adverse effects on the display effect.

Exemplarily, the scan drive circuit may be coupled to the timing control circuit through multiple clock signal lines CL. Each clock signal line CL is coupled to multiple GOA units, and is configured to transmit a clock signal CLK to each of clock signal terminals CLK of the multiple GOA units coupled thereto. The arrangement of the clock signal lines CL not specifically limited, which may be a 4CLK structure, a 6CLK structure, an 8CLK structure, a 12CLK structure, or the like.

Exemplarily, n GOA units are divided into k groups, and GOA units spaced by k rows belong to one group. That is, the $1^{st}$ GOA unit, the (1+k)-th GOA unit, the (1+2k)-th GOA unit . . . serve as the $1^{st}$ Group, the $2^{nd}$ GOA unit, the (2+k)-th GOA unit, the (2+2k)-th GOA unit . . . serve as the $2^{nd}$ group, and so on, until the k-th GOA unit, the 2k-th GOA unit, the 3k-th GOA unit . . . serve as the k-th Group. A signal output terminal Output of the m-th GOA unit is connected to a signal input terminal Input of the (m+k)-th GOA unit, and a signal output terminal Output of the (m+k)-th GOA unit is connected to a reset signal terminal Reset of the m-th GOA unit, and so on, to realize the cascade of the GOA units. The $1^{st}$ GOA unit in the $1^{st}$ group to the $1^{st}$ GOA unit in the k-th group are the $1^{st}$ GOA unit to the k-th GOA unit, respectively, and the remaining GOA units in each group are cascaded after a signal output terminal of the $1^{st}$ GOA unit in each group, where k is a positive integer greater than or equal to 4, and m and n are both positive integers. In the entire scan drive circuit, an input signal transmitted to signal input terminals Input of the GOA units, which are G1, G2, G3, . . . Gk, is a frame start signal STV. For example, referring to FIG. 2, the n GOA units are divided into 4 groups, and GOA units spaced by 4 rows belong to one group. That is, the $1^{st}$ GOA unit, the $5^{th}$ GOA unit, the $9^{th}$ GOA unit . . . serve as the $1^{st}$ group, the $2^{nd}$ GOA unit, the $6^{th}$ GOA unit, the $10^{th}$ GOA unit . . . serve as the $2^{nd}$ group, and so on, until the $4^{th}$ GOA unit, the $8^{th}$ GOA unit, the $12^{th}$ GOA unit . . . serve as the $4^{th}$ group. An input signal transmitted to signal input terminals Input of G1, G2, G3 and G4 is the frame start signal STV A signal output terminal Output of G1 is connected to a signal input terminal Input of G5, a signal output terminal Output of G2 is connected to a signal input terminal Input of G6, a signal output terminal Output of G3 is connected to a signal input terminal Input of G7, and a signal output terminal Output of G4 is connected to a signal input terminal Input of G8; moreover, a signal output terminal Output of G5 is connected to a reset signal terminal Reset of G1, a signal output terminal Output of G6 is connected to a reset signal terminal Reset of G2, a signal output terminal Output of G7 is connected to a reset signal terminal Reset of G3, and a signal output terminal Output of G8 is connected to a reset signal terminal Reset of G4, and so on.

Exemplarily, the above-mentioned scan drive circuit may further include multiple dummy (Dummy) GOA units (not shown in the figure). The number of the dummy GOA units is not specifically limited, and the signal connection relationship can be adjusted according to the number of the dummy GOA units. The internal structure of the dummy GOA unit is substantially the same as that of the GOA unit. The difference is that a signal input terminal of a dummy GOA unit at each level is directly connected to a signal output terminal of a dummy GOA unit at a previous level. The dummy GOA unit at each level is mainly responsible for signal activation, playing the role of signal triggering for an activation of subsequent GOA units, and not directly control gate line scanning. Exemplarily, a signal input terminal of a dummy GOA unit at the first-level inputs the frame start signal STV, and a signal output terminal of a dummy GOA unit at the last-level is connected to the signal input terminal of the GOA unit G1 at the first-level.

Figure 3:
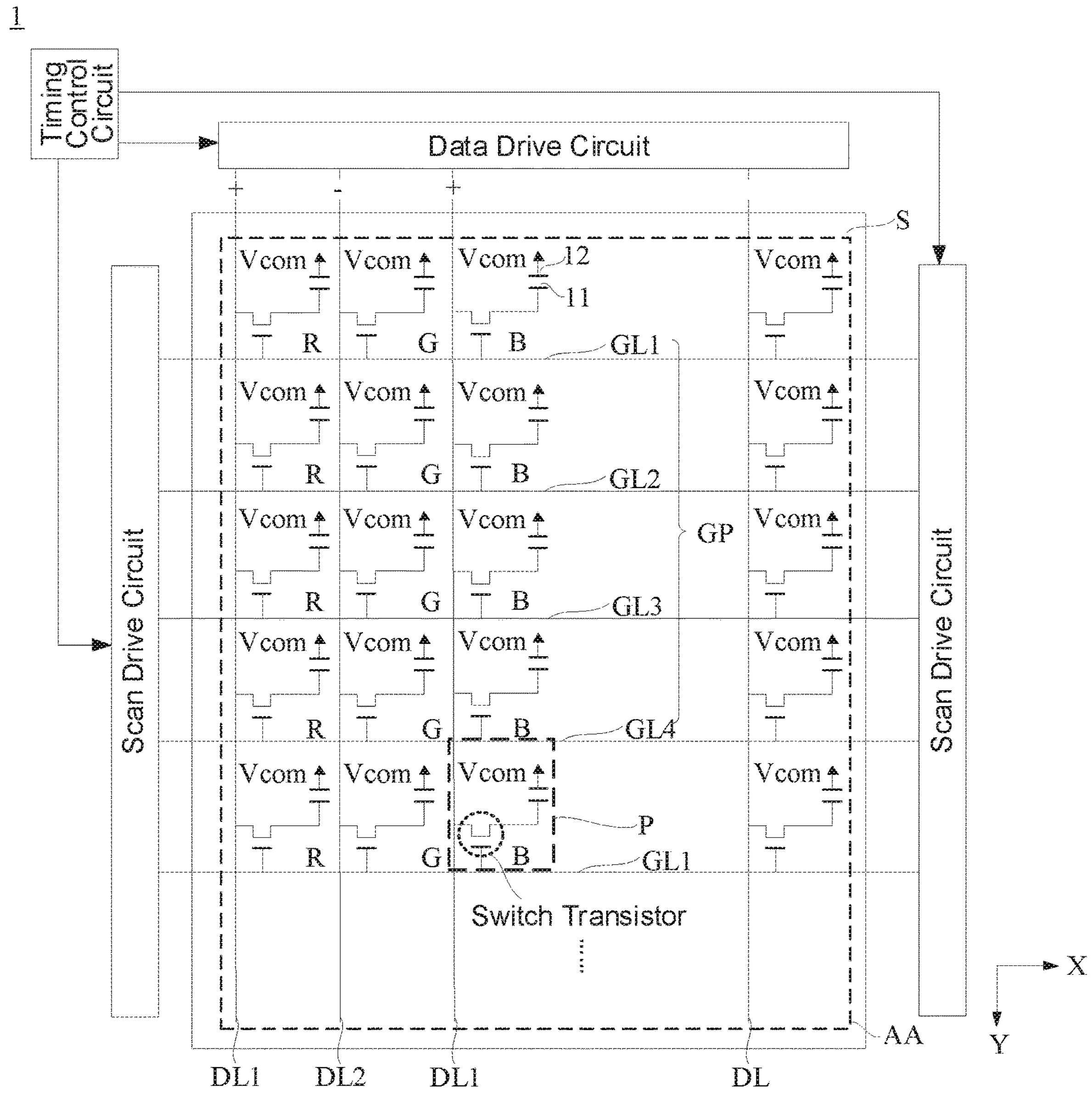
FIG. 3 is a structural diagram of a display apparatus, in accordance with yet some other embodiments.

Exemplarily, referring to FIG. 3, the display apparatus can adopt a double-side driving. That is, the display apparatus includes two scan drive circuits arranged oppositely along the row direction (i.e., the X direction), and the structures of the two scan drive circuits are completely the same. Both ends of each gate line GL are coupled to the two scan drive circuits located on the left and right respectively, and signals transmitted by corresponding signal terminals (including signal input terminals Input, signal output terminals Output, reset signal terminals Reset, clock signal terminals CLK and frame reset signal terminals Tot-Rst) of GOA units in the two scan drive circuits coupled to the same gate line GL are identical. In this way, since a scan signal transmitted by each gate line GL is input from both ends of this gate line GL, the degree of signal attenuation on the gate line GL may be reduced to a certain extent. For medium and large-sized display apparatuses, the effect of reducing signal attenuation is more prominent, thereby avoiding differences in display brightness at different positions in the display area AA, improving display uniformity, and improving display effects.

Figure 4:
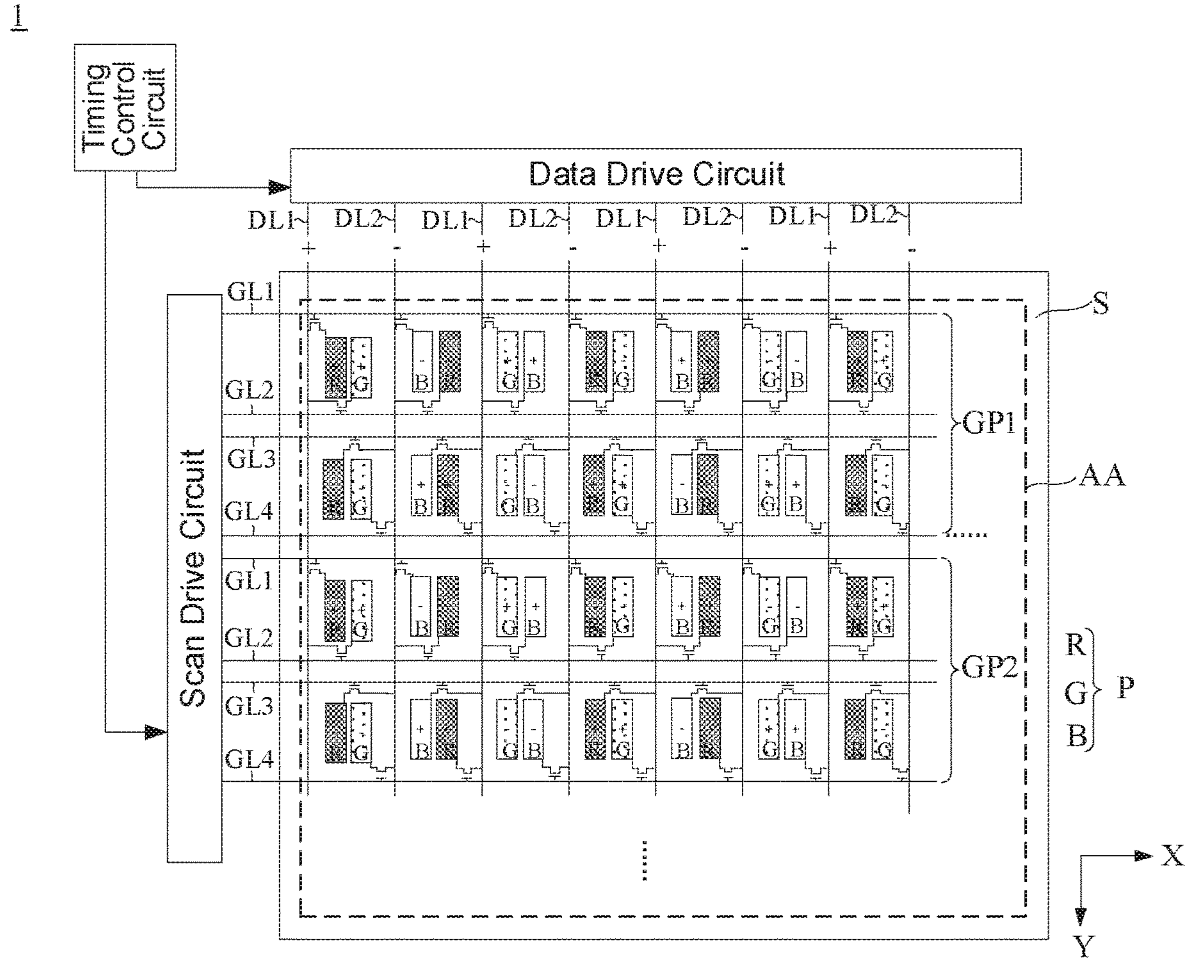
FIG. 4 is a structural diagram of a display apparatus, in accordance with yet some other embodiments.

Exemplarily, referring to FIGS. 3 and 4, the plurality of gate lines GL may be divided into multiple gate line groups GP. Each gate line group GP includes multiple gate lines GL. The multiple gate lines GL include a first gate line GL1, a second gate line GL2 and a third gate line GL3 that are arranged adjacent to one another along the column direction (i.e., the Y direction). During the row-by-row scanning, the order in which the gate lines GL are turned on is the first gate line GL1, the second gate line GL2, and the third gate line GL3. That is, the display apparatus includes the multiple gate line groups GP, and each gate line group GP includes a first gate line GL1, a second gate line GL2 and a third gate line GL3 that are arranged adjacent to one another along the column direction.

For example, referring to FIG. 3, the display apparatus includes a plurality of sub-pixels P arranged in an array. Any two adjacent sub-pixels P in the same row have different colors, and any two adjacent sub-pixels P in the same column have the same color. Any two rows of sub-pixels P adjacent to each other along the column direction is provided with a gate line GL therebetween. The plurality gate lines GL arranged adjacent to one another along the column direction form the multiple gate line groups GP. Each gate line group GP includes the first gate line GL1, the second gate line GL2 and the third gate line GL3 that are arranged adjacent to one another along the column direction. Multiple sub-pixels P coupled to different gate lines GL are located in different rows. For example, referring to FIG. 3, multiple sub-pixels P coupled to the first gate line GL1, and multiple sub-pixels P coupled to the second gate line GL2 are located in different rows.

As another example, referring to FIG. 4, the display apparatus includes a plurality of sub-pixels P arranged in an array. Any two adjacent sub-pixels P in the same row have different colors, and any two adjacent sub-pixels P in the same column have the same color. At least one (e.g., each) data line DL is coupled to two sub-pixels P in the same row, and the two sub-pixels P coupled to the same data line DL are coupled to different gate lines GL, respectively. That is, a dual gate line technology is adopted. Here, the multiple gate line groups GP are arranged adjacent to one another along the column direction. Each gate line group GP includes the first gate line GL1, the second gate line GL2 and the third gate line GL3 that are arranged adjacent to one another along the column direction. Of multiple sub-pixels P between two adjacent gate lines GL along the column direction, some sub-pixels P are coupled to one of the two adjacent gate lines GL along the column direction, and the remaining sub-pixels P are coupled to the other of the two adjacent gate lines GL along the column direction. In this example, the application of the dual gate line technology reduces the number of the data lines DL in the display apparatus by half, and doubles the number of the gate lines GL. Accordingly, the number of circuit structures in the data drive circuits connected to the data lines DL is reduced by half, and the number of the scan drive circuits connected to the gate lines GL is doubled. Since the unit price of the scan drive circuit is less than the unit price of the data drive circuit, the application of the dual gate line GL technology is conducive to cost control to a certain extent.

For the sake of clarity of expression, the following employs the structure of the display apparatus shown in FIG. 4 as an example to illustrate the embodiments of the present disclosure accordingly. It can be understood that a corresponding setting in any embodiment below may also be applied to the display apparatus shown in FIG. 3, the same beneficial effects may be produced, which will not be described again.

Figure 5:
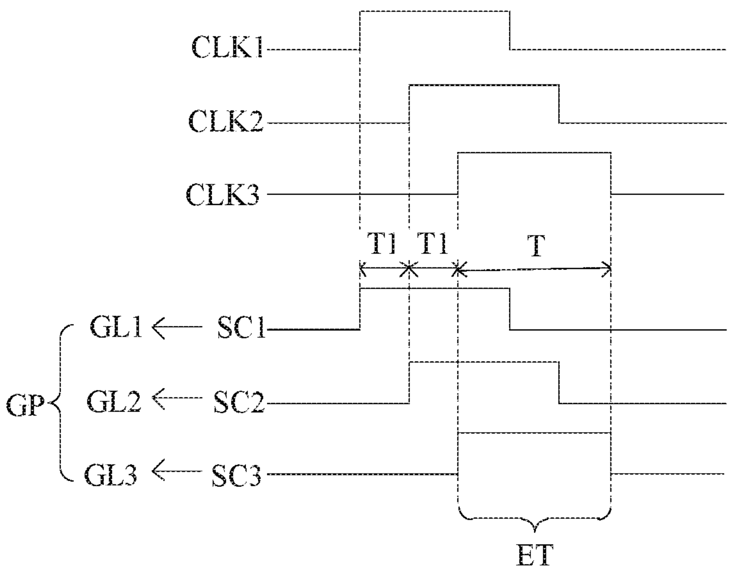
FIG. 5 is a timing diagram of scan signals, in accordance with some embodiments.

In the related art, referring to FIGS. 4 and 5, the liquid crystal display apparatus normally implements image display using a row-by-row scanning mode. In a frame scan cycle, a duration of an effective scan period ET of a scan signal SC transmitted by each gate line GL is the same, and the duration of the effective scan period ET is T. For any two adjacent gate lines GL along the column direction, compared with a start moment of an effective scan period ET of a scan signal SC transmitted by one gate line GL first, an effective scan period ET of a scan signal SC transmitted by the other gate line GL later is delayed by a fixed time length. That is, for effective scan periods ET of scan signals SC transmitted by any two adjacent gate lines GL along the column direction, the absolute value of the time difference between their star moments is the same, which is T1. For any three adjacent gate lines GL along the column direction, a total duration required to complete the row-by-row scanning for the three gate lines GL is equal to (T+2*T1).

Figure 6:
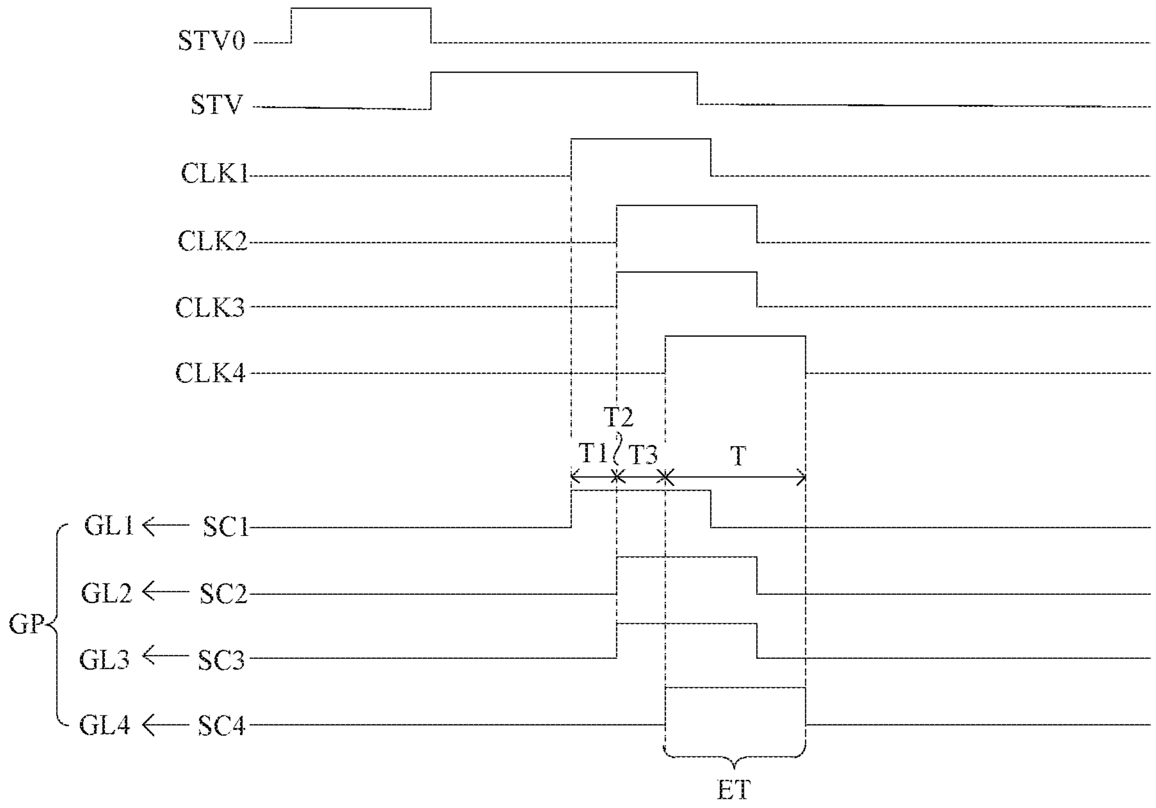
FIG. 6 is a timing diagram of scan signals, in accordance with some other embodiments.
Figure 7:
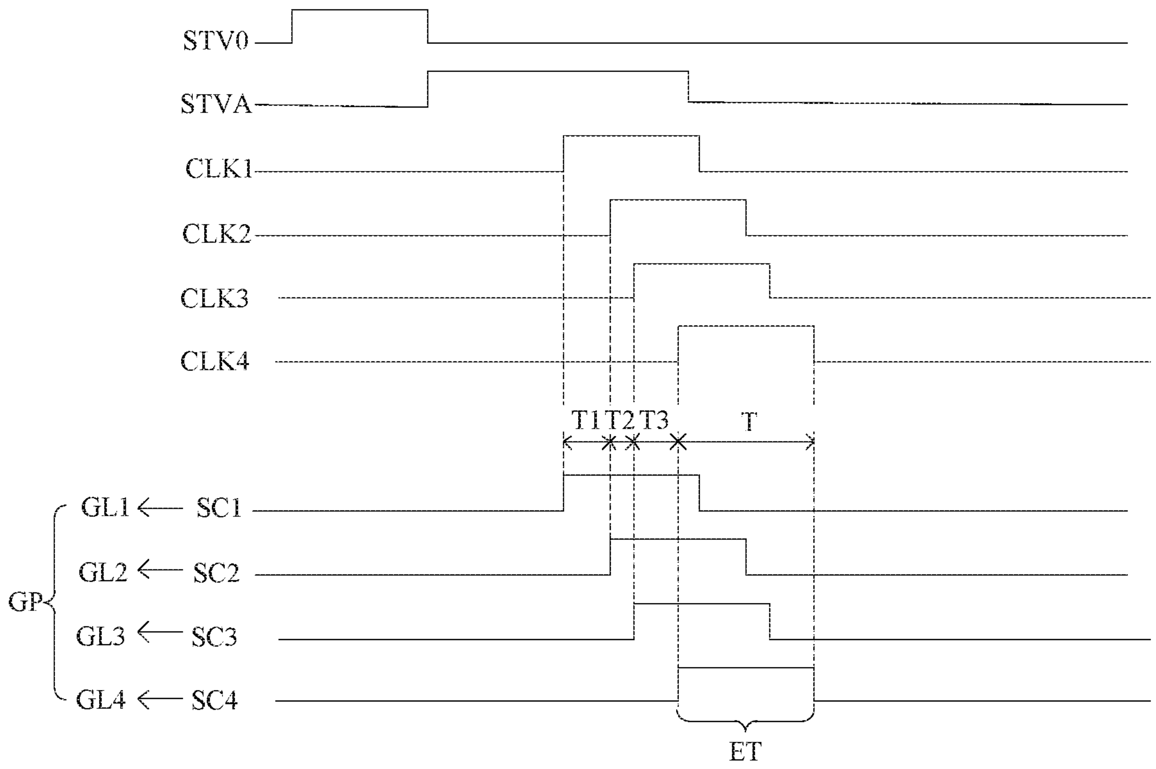
FIG. 7 is a timing diagram of scan signals, in accordance with yet some other embodiments.
Figure 8:
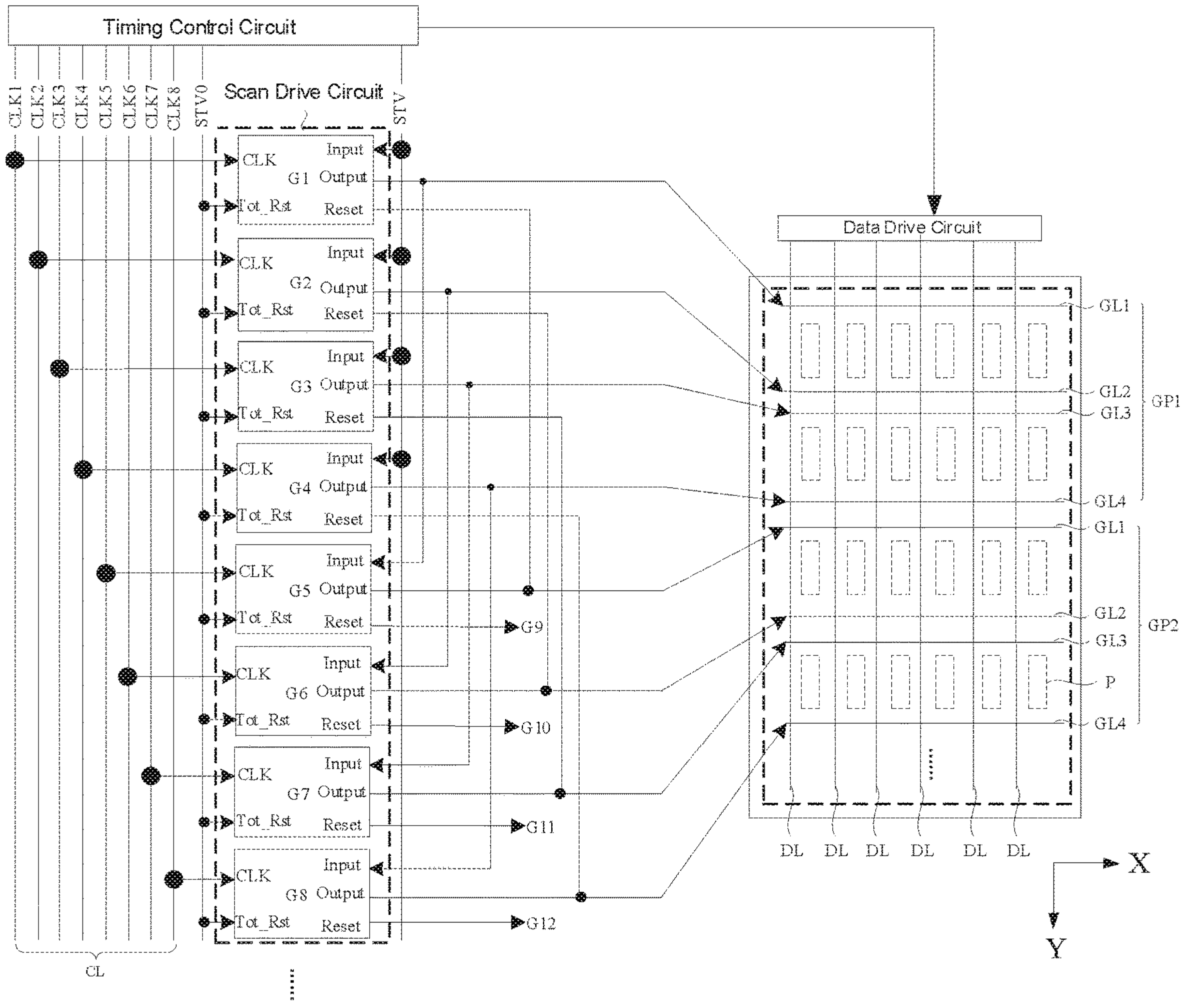
FIG. 8 is a structural diagram of a display apparatus, in accordance with yet some other embodiments.

In the present disclosure, for example, referring to FIGS. 4, 6 and 7, in a frame scan cycle, the scan drive circuit outputs scan signals SC to the plurality of gate lines GL respectively, which includes outputting a first scan signal SC1 to the first gate line is GL1, outputting a second scan signal SC2 to the second gate line GL2, and outputting a third scan signal SC3 to the third gate line GL3 in sequence. A duration of an effective scan period ET of the first scan signal SC1, a duration of an effective scan period ET of the second scan signal SC2, and a duration of an effective scan period ET of the third scan signal SC3 are equal, all of which are T. A start moment of the effective scan period ET of the second scan signal SC2 is delayed by a first time length T1 compared with a start moment of the effective scan period ET of the first scan signal SC1, and a start moment of the effective scan period ET of the third scan signal SC3 is delayed by a second time length T2 compared with the start moment of the effective scan period ET of the second scan signal SC2, where the second time length is less than the first time length.

For a scan signal SC, a period of a voltage signal that is capable of keeping a switch transistor coupled to a gate line GL transmitting this scan signal SC in an on state is the effective scan period ET, and a duration of the period is T. When a gate line GL transmits a scan signal SC to multiple switch transistors coupled thereto, the time difference between turn-on moments of the multiple switch transistors coupled to this gate line GL is very small and can be ignored. Therefore, multiple switch transistors coupled to the same gate line GL may be regarded as being turned on simultaneously. In the frame scan cycle, the start moment of the effective scan period ET of the second scan signal SC2 is delayed by the first time length T1 compared with the start moment of the effective scan period ET of the first scan signal SC1; that is, multiple switch transistors coupled to the first gate line GL1 are turned on earlier than multiple switch transistors coupled to the second gate line GL2, and the time difference between turn-on moments of the multiple switch transistors coupled to the second gate is line GL2 and the multiple switch transistors coupled to the first gate line GL1 is the first time length T1; the start moment of the effective scan period ET of the third scan signal SC3 is delayed by the second time length T2 compared with the start moment of the effective scan period ET of the second scan signal SC2; that is, multiple switch transistors coupled to the second gate line GL2 are turned on earlier than multiple switch transistors coupled to the third gate line GL3, and the time difference between turn-on moments of the multiple switch transistors coupled to the third gate line GL3 and the multiple switch transistors coupled to the second gate line GL2 is the second time length T2. The magnitude of the first time length T1 is not specifically limited. Exemplarily, the first time length T1 is not greater than a duration that an effective scan period ET of any scan signal SC lasts. Exemplarily, the first time length T1 may be equal to ⅓ of the duration that the effective scan period ET of any scan signal SC lasts.

Exemplarily, referring to FIGS. 6 and 7, the duration of the effective scan period ET of the scan signal SC output by each gate line GL is also T, the first time length is T1, and the second time length is T2. A total duration required to complete the row-by-row scanning for the first gate line GL1, the second gate line GL2 and the third gate line GL3 is equal to (T+T1+T2). Compared with the total duration, T+2*T1, required to complete the row-by-row scanning for the three gate lines GL in the related art, since T2<T1, (T+T1+T2)<(T+2*T1). It can be seen that compared with the related art, when the row-by-row scanning is performed on the plurality of gate lines GL, the technical solution documented in the present disclosure requires a shorter total duration and a shorter scan period for a single frame, thereby facilitating the realization of a higher refresh rate and achieving a better display effect.

Exemplarily, the magnitude of the second time length T2 is not specifically limited. For example, referring to FIG. 6, the second time length T2 is zero. That is, the multiple switch transistors coupled to the second gate line GL2 and the multiple switch transistors coupled to the third gate line GL3 are turned on simultaneously. As another example, referring to FIG. 7, the second time length T2 is greater than 0 and less than or equal to ½ of the first time length T1. That is, the multiple switch transistors coupled to the second gate line GL2 are turned on earlier than the multiple switch transistors coupled to the third gate line GL3. Exemplarily, the time difference between turn-on moments of the multiple switch transistors coupled to the third gate line GL3 and the multiple switch transistors coupled to the second gate line GL2 may be ½ of the second time length T2. In the above schemes, the second time length T2 is less than the first time length T1. Therefore, similar to the above, when the scanning is performed on the plurality of gate lines GL, the total duration required for the scanning process is reduced, and all of the above solutions can shorten the scan cycle of a frame and improve the refresh rate.

Exemplarily, referring to FIGS. 6 and 7, in a frame scan cycle, for scan signals SC respectively output by the scan drive circuit to any two adjacent gate lines GL along the column direction in a gate line group GP, respective effective scan periods ET at least partially overlap. Exemplarily, the scan drive circuit sequentially outputs scan signals SC to the first gate line GL1, the second gate line GL2 and the third gate line GL3 arranged along the column direction in the gate line group GP. If respective effective scan periods ET of the first scan signal SC1, the second scan signal SC2 and the third scan signal SC3 do not overlap, and the first time length is T1 and the second time length is T2, a total duration required to complete the row-by-row scanning for the first gate line GL1, the second gate line GL2 and the third gate line GL3 is equal to (3*T+T1+T2). While referring to FIGS. 6 and 7, if the respective effective scan periods ET of the first scan signal SC1, the second scan signal SC2 and the third scan signal SC3 overlap, and the first time length is T1 and the second time length is T2, the total duration required to complete the row-by-row scanning for the first gate line GL1, the second gate line GL2 and the third gate line GL3 is equal to (T+T1+T2). Since (T+T1+T2)<(3*T+T1+T2), it can be seen that the above settings may further shorten the scan cycle of a frame, thereby further increasing the refresh rate and achieving better display effects.

Exemplarily, referring to FIGS. 2, 6 and 7, the clock signal lines may adopt a 4CLK structure. In this case, the gate line group GP further includes a fourth gate line GL4 adjacent to the third gate line GL3 along the column direction; and the scan drive circuit outputs a fourth scan signal SC4 to the fourth gate line GL4; a start moment of an effective scan period ET of the fourth scan signal SC4 is delayed by a third time length T3 compared with the start moment of the effective scan period ET of the third scan signal SC3, where the third time length T3 is equal to the first time length T1. In this case, the second time length T2 is less than the first time length T1, which means that the effective scan period ET of the second scan signal SC2 transmitted by the second gate line GL2 start early, accordingly, an effective scan period ET of a scan signal SC of each gate line GL which is scanned after the second gate line GL2 is also started early, and the total time for the row-by-row scanning for the plurality of gate lines will also be shortened, resulting in a shorter frame scan cycle and a higher refresh rate. In addition, using fewer clock signal lines CL is beneficial to reducing the number of pins of the integrated circuit and narrowing the bezel of the display apparatus, allowing users to have a better visual experience.

Exemplarily, referring to FIGS. 4, 6 and 7, in a case where the gate line group GP further includes the fourth gate line GL4, and the scan drive circuit outputs the first scan signal SC1 and the fourth scan signal SC4 to the gate line group GP, respective effective scan periods ET at least partially overlap. That is, within the effective scan period ET of the first scan signal SC1, the effective scan periods ET of the scan signals SC transmitted by the second gate line GL2, the third gate line GL3, and the fourth gate line GL4 start in sequence. For the first gate line GL1, the second gate line GL2, the third gate line GL3 and the fourth gate line GL4, the effective scan periods ET of the scan signals SC transmitted by any two adjacent gate lines GL partially overlap, and the effective scan periods ET of the scan signals SC transmitted by the four gate lines GL partially overlap with one another. Therefore, a total duration required for the scan drive circuit to output the scan signals SC to gate lines GL in a gate line group GP is shortened, and accordingly, a frame scan cycle to complete scanning to the gate lines GL in the multiple gate line groups GP is also shortened, further increasing the refresh rate and achieving better display effects.

As another example, referring to FIGS. 8 to 11, the clock signal lines CL may adopt an 8CLK structure. In this case, the multiple gate line groups GP may include first gate line group(s) GP1 and second gate line group(s) GP2 arranged sequentially adjacent to each other along the column direction (i.e., the Y direction). That is, any two adjacent gate line groups GP along the column direction in the multiple gate line groups GP are divided into a first gate line group GP1 and a second gate line group GP2. The first gate line group GP1 and the second gate line group GP2 each include a first gate line GL1, a second gate line GL2, a third gate line GL3 and a fourth gate line GL4 that are arranged sequentially adjacent to one another along the column direction. The first gate line group GP1 is arranged in front of the second gate line group GP2.

In a frame scan cycle, an effective scan period ET of a scan signal SC output by the scan drive circuit to each gate line GL in the second gate line group GP2 is delayed by a non-zero time length, compared with an effective scan period ET of a scan signal SC output by the scan drive circuit to each gate line GL in the first gate line group GP1. That is, the effective scan periods ET of the scan signals SC transmitted by the gate lines GL in the first gate line group GP1 all begin before the effective scan periods ET of the scan signals SC transmitted by the gate lines GL in the second gate line group GP2. Exemplarily, compared with the start moment of the effective scan period ET of the fourth scan signal SC4 output by the fourth gate line GL4 in the first gate line group GP1, the start moment of the effective scan period ET of the first scan signal SC1 output by the first gate line GL1 in the second gate line group GP2 is delayed by a fourth time length T4, where the fourth time length T4 is equal to the first time length T1. That is, the effective scan period ET of the first scan signal SC1 transmitted by the first gate line GL1 in the second gate line group GP2 starts at a moment that is delayed by the fourth time length T4 from the start moment of the effective scan period ET of the fourth scan signal SC4 transmitted by the fourth gate line GL4 in the first gate line group GP1. Since the first gate line group GP1 and the second gate line group GP2 only differ in their setting positions, a timing of the scan signals SC respectively transmitted by the gate lines GL in the second gate line group GP2 is similar to a timing of the scan signals SC respectively transmitted by the gate lines GL in the first gate line group GP1, and thus the total time length required for completing the scanning of the gate lines GL in the second gate line group GP2 is also shortened, and a frame scan cycle of the display apparatus provided with a plurality of first gate line groups GP1 and second gate line groups GP2 may be shortened as well, resulting in a high refresh rate and a good display effect. In addition, using more clock signal lines to transmit the clock signals may reduce the load on a single clock signal line, which is beneficial to reducing power consumption.

Figure 12:
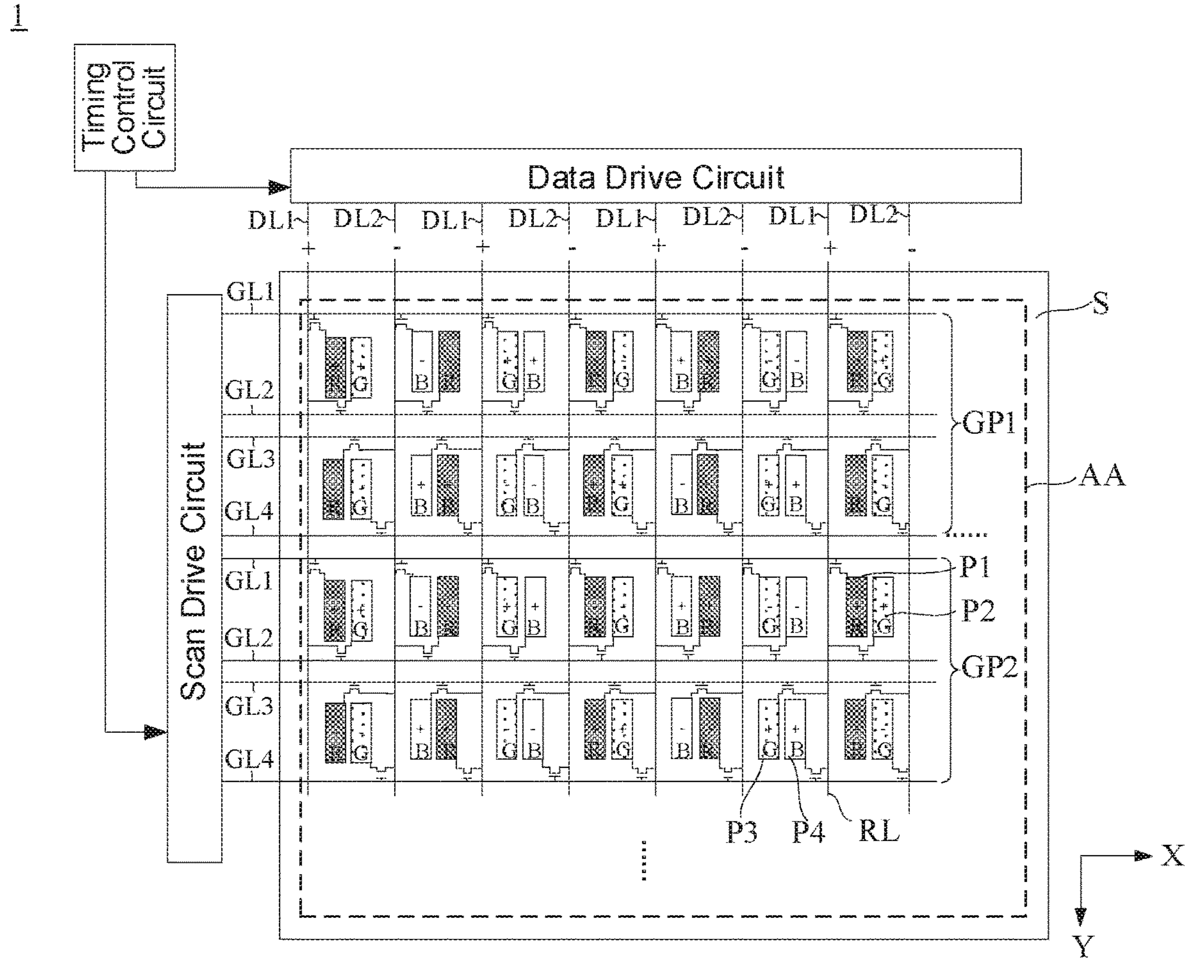
FIG. 12 is a structural diagram of a display apparatus, in accordance with yet some other embodiments.

Exemplarily, referring to FIG. 12, the plurality of data lines DL include representative data lines RL. Multiple sub-pixels coupled to multiple gate lines in a gate line group include a first sub-pixel P1 coupled to a representative data line RL and a first gate line GL1, and a second sub-pixel P2 coupled to the representative data line RL and a second gate line GL2, and a third sub-pixel P3 coupled to the representative data line RL and a third gate line GL3, where the second sub-pixel P2 and the third sub-pixel P3 have the same color. In a frame scan cycle, a first data signal D1 is written to the first sub-pixel P1 through the representative data line RL, and a second data signal D2 or a third data signal D3 is simultaneously written to the second sub-pixel P2 and the third sub-pixel P3 through the representative data line RL, where the first data signal D1 is a data signal corresponding to pixel data for the first sub-pixel P1, and the second data signal D2 is a data signal corresponding to pixel data for the second sub-pixel P2, and the third data signal D3 is a data signal corresponding to pixel data for the third sub-pixel P3. The representative data line RL is any data line DL among the plurality of data lines DL.

In the related art, in order to write data to each of the first sub-pixel P1, the second sub-pixel P2 and the third sub-pixel P3 which are coupled to different gate lines GL, it is necessary to write the first data signal D1 to the first sub-pixel P1, write the second data signal D2 to the second sub-pixel P2, and write the third data signal D3 to the third sub-pixel P3 in sequence through the data line DL. As a result, the data drive circuit needs to carry out an output process of the data signal three times.

In accordance with the embodiments of the present disclosure, it is only necessary to write the first data signal D1 to the first sub-pixel P1 through the data line DL, and thereafter write the second data signal D2 or the third data signal D3 to the second sub-pixel P2 and the third sub-pixel P3 simultaneously through the data line DL. The data drive circuit needs to carry out the output processes of the data signal only two times to realize data writing to the three sub-pixels P respectively coupled to the three gate lines GL. As the number of outputting of the data signal Data from the data drive circuit is reduced, the corresponding total time length required to complete data writing is also reduced, which is beneficial to further shortening a frame scan cycle and increasing the refresh rate. Moreover, the second sub-pixel P2 and the third sub-pixel P3 are spatially located proximity to each other, and the second sub-pixel P2 and the third sub-pixel P3 have the same color (that is, the second sub-pixel P2 and the third sub-pixel P3 are both red sub-pixels or both blue sub-pixels or both green sub-pixels), therefore, gray scales of the second sub-pixel P2 and the third sub-pixel P3 when displaying images are also relatively close. Therefore, sharing the data signal of one of the two sub-pixels for display not only realizes an increase in the refresh rate, but also ensures that the display apparatus has a good display effect.

Figure 9:
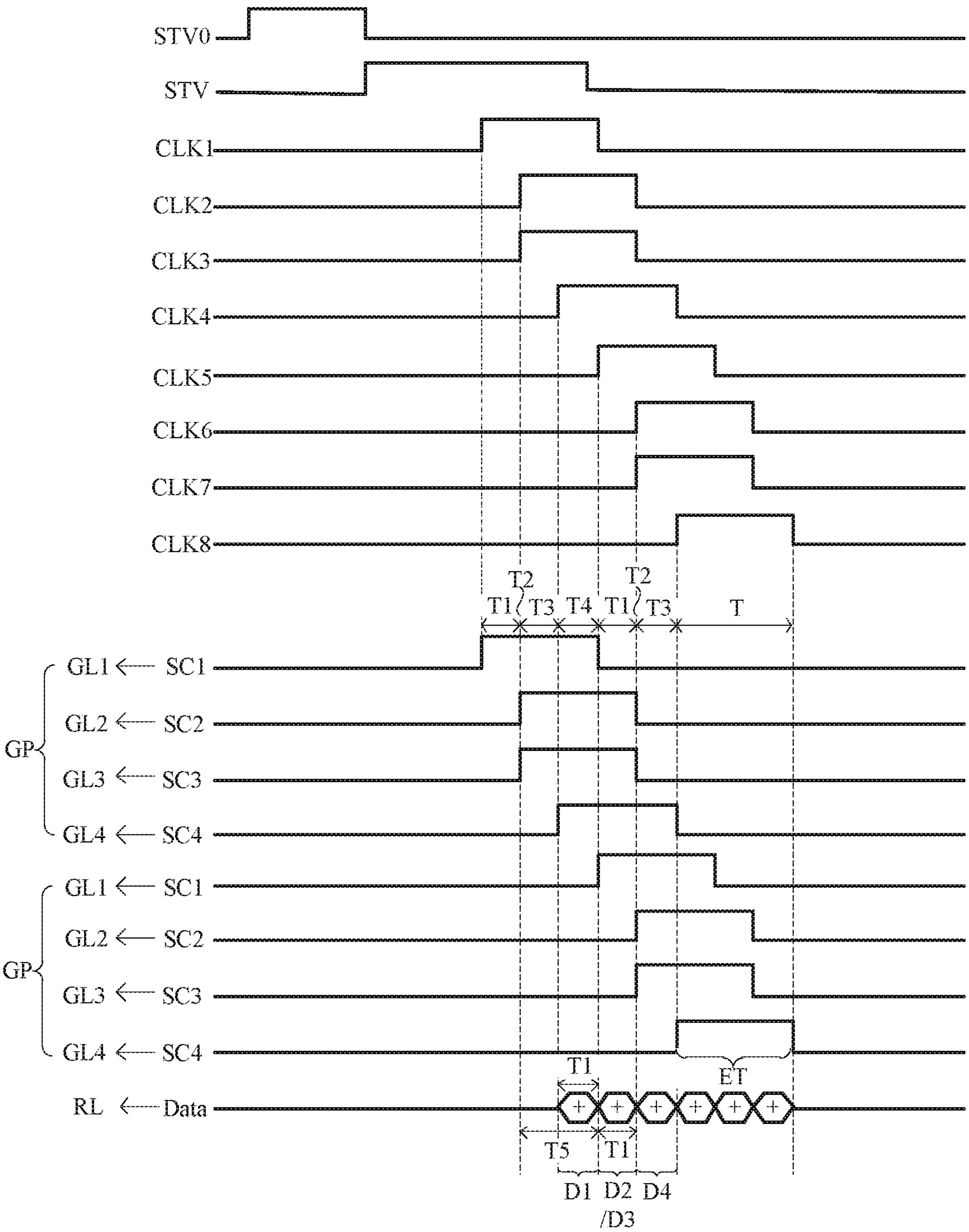
FIG. 9 is a timing diagram of scan signals and a data signal, in accordance with some embodiments.

Exemplarily, referring to FIGS. 9 and 12, in a frame scan cycle, the second time length T2 is zero. The first data signal D1 is written to the first sub-pixel P1 through the representative data line RL, and the second data signal D2 is simultaneously written to the second sub-pixel P2 and the third sub-pixel P3 through the representative data line RL. The second data signal D2 lasts for a time length equal to the first time length T1, and a start moment of the second data signal D2 is delayed by a fifth time length T5 compared with the start moment of the effective scan period of ET the second scan signal SC2, where the fifth time length T5 is 2 times the first time length T1.

For example, referring to FIGS. 9 and 12, the second time length T2 is zero. The gate line group GP includes a first gate line GL1, a second gate line GL2, a third gate line GL3 and a fourth gate line GL4, and multiple sub-pixels P coupled to multiple gate line GL in a gate line group GP further include a fourth sub-pixel P4 coupled to a representative data line RL and a fourth gate line GL4. A fourth data signal D4 is written to the fourth sub-pixel P4 through the representative data line RL, where the fourth data signal D4 is a data signal corresponding to pixel data for the fourth sub-pixel P4. The specific timing of the first data signal D1 and the fourth data signal D4 is not specifically limited.

For example, with continued reference to FIGS. 9 and 12, the second data signal D2 is simultaneously written to the second sub-pixel P2 and the third sub-pixel P3. The first data signal D1, the second data signal D2, and the fourth data signal D4 each last for the time length equal to the first time length T1. A duration of the time difference between a start moment of the first data signal D1 and the start moment of the effective scan period of the first scan signal SC1 is equal to 2 times the first time length T1; and a duration of the time difference between a start moment of the fourth data signal D4 and the start moment of the effective scan period ET of the fourth scan signal SC4 is also equal to 2 times the first time length T1. The start moment of the second data signal D2 is delayed by the fifth time length T5 compared with the start moment of the effective scan period of ET the second scan signal SC2, where the fifth time length T5 is 2 times the first time length T1. Moreover, a duration of the time difference between a start moment of the third data signal D3 and the start moment of the effective scan period ET of the third scan signal SC3 is also equal to 2 times the first time length T1. According to the above settings, the data signal Data may be written to multiple sub-pixels P including the second sub-pixel P2 and the third sub-pixel P3 through only a writing process once. The number of times of writing the data signal Data is reduced, and accordingly, the total time length required for data writing is reduced, which is beneficial to further shortening a frame scan cycle and increasing the refresh rate.

As another example, referring to FIGS. 9 and 12, in a frame scan cycle, the second time length T2 is zero. The first data signal D1 is written to the first sub-pixel P1 through the representative data line RL, and the third data signal D3 is simultaneously written to the second sub-pixel P2 and the third sub-pixel P3 through the representative data line RL. The third data signal D3 lasts for a time length equal to the first time length T1, and a start moment of the third data signal D3 is delayed by a fifth time length T5 compared with the start moment of the effective scan period of ET the second scan signal SC2, where the fifth time length T5 is 2 times the first time length T1. Similar to the foregoing, this setting likewise has a short data writing time and may also achieve a high refresh rate.

Figure 10:
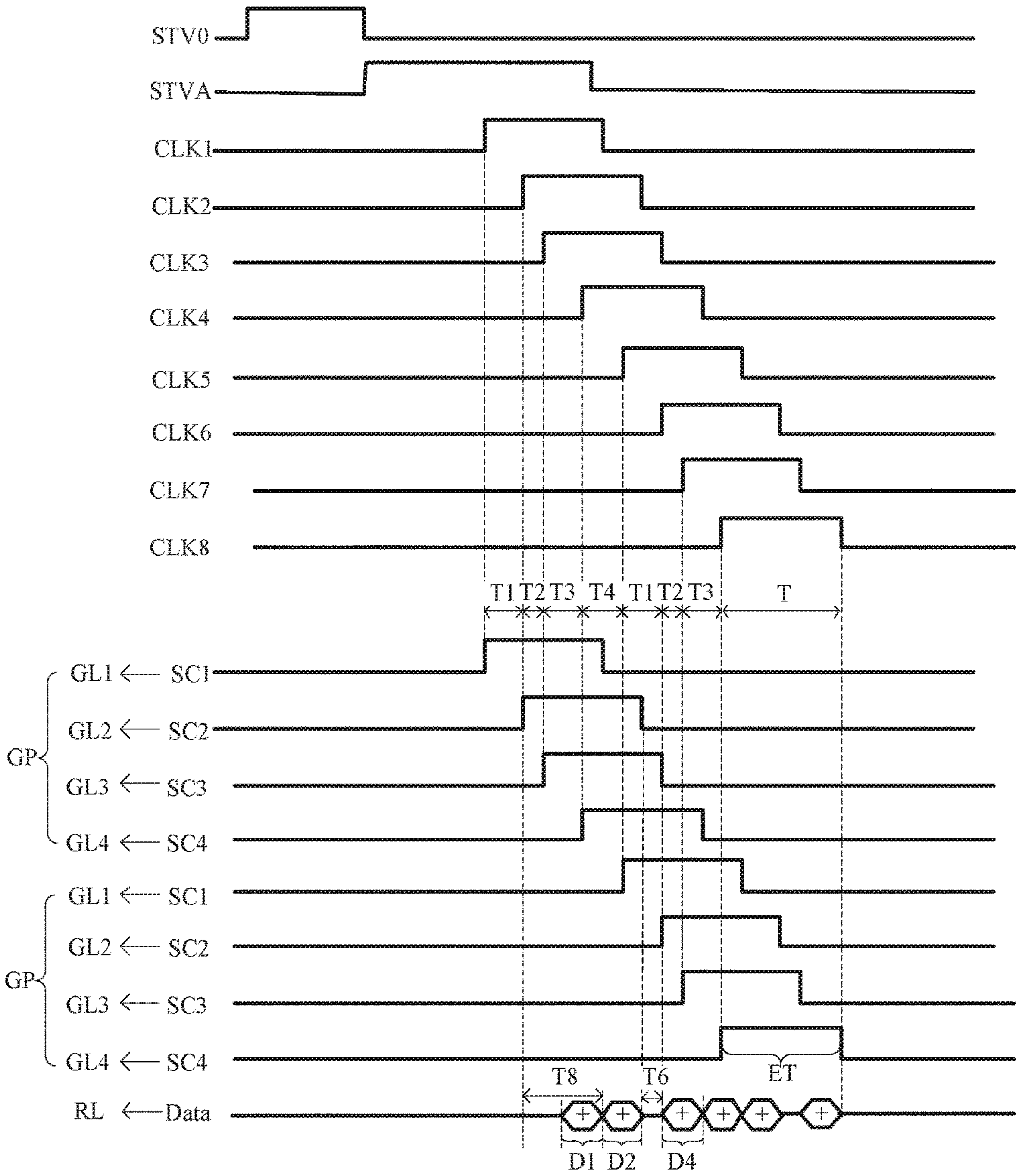
FIG. 10 is a timing diagram of scan signals and a data signal, in accordance with some other embodiments.

Exemplarily, referring to FIGS. 10 and 12, the second time length T2 is not zero. During the effective scan period ET when the second gate line GL2 transmits the second scan signal SC2, the scanning of the third gate line GL3 starts in advance, and it is also possible to write the second data signal D2 to the second sub-pixel P and the third sub-pixel P simultaneously through the representative data line RL. Similar to the foregoing, a reduction in the number of writing times for the data signal Data can likewise result in a short scan cycle and a high refresh rate.

Figure 11:
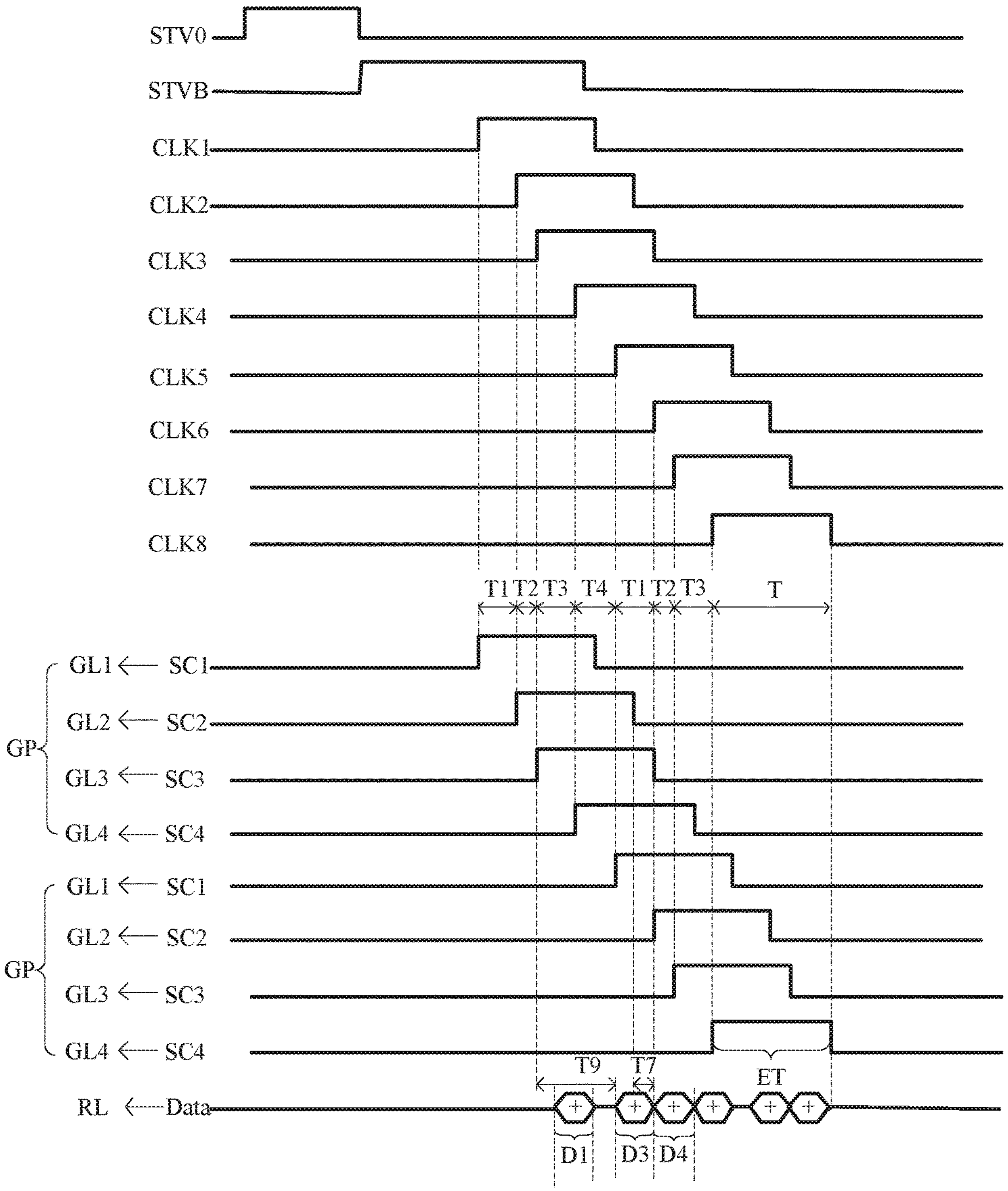
FIG. 11 is a timing diagram of scan signals and a data signal, in accordance with yet some other embodiments.

Exemplarily, referring to FIGS. 10, 11 and 12, the second time length T2 is greater than 0 and less than or equal to ½ of the first time length T1. Referring to FIGS. 10 and 12, in an odd-numbered frame scan cycle, the first data signal D1 is written to the first sub-pixel P1 through the representative data line RL, and the second data signal D2 is simultaneously written to the second sub-pixel P2 and the third sub-pixel P3 through the representative data line RL; and an end moment of the second data signal D2 is preceded by a sixth time length T6 compared with an end moment of the effective scan period ET of the third scan signal SC3. Referring to FIGS. 11 and 12, in an even-numbered frame scan cycle, the first data signal D1 is written to the first sub-pixel P1 through the representative data line RL, and the third data signal D3 is simultaneously written to the second sub-pixel P2 and the third sub-pixel P3 through the representative data line RL; and an end moment of the third data signal D3 is delayed by a seventh time length T7 compared with an end moment of the effective scan period ET of the second scan signal SC2. The second data signal D2 and the third data signal D3 both last for a time length equal to the first time length T1, and the sixth time length T6 and the seventh time length T7 are both greater than zero.

The process of displaying images by the display apparatus includes a plurality of frame scan cycles, in which the plurality of frame scan cycles are divided into odd-numbered frame scan cycles and even-numbered frame scan cycles. The timing control circuit inputs an odd-numbered frame start signal STVA to the scan drive circuit when the scan cycle is an odd-numbered frame scan cycle, and inputs an even-numbered frame start signal STVB to the scan drive circuit when the scan cycle is an even-numbered frame scan cycle. Similar to the foregoing, in this setting mode, the data signal is written to the second sub-pixel P2 and the third sub-pixel P3 through a data writing process once. It is also possible to reduce the number of times that the data drive circuit outputs the data signal Data in a frame scan cycle, and therefore also has the same aforementioned beneficial effect, which will not be repeated here.

As another example, the second time length T2 is greater than 0 and less than or equal to ½ of the first time length T1. Referring to FIGS. 11 and 12, in an odd-numbered frame scan cycle, the first data signal D1 is written to the first sub-pixel P1 through the representative data line RL, and the third data signal D3 is simultaneously written to the second sub-pixel P2 and the third sub-pixel P3 through the representative data line RL; and an end moment of the third data signal D3 is delayed by a seventh time length T7 compared with an end moment of the effective scan period ET of the second scan signal SC2. Referring to FIGS. 10 and 12, in an even-numbered frame scan cycle, the first data signal D1 is written to the first sub-pixel P1 through the representative data line RL, and the second data signal D2 is simultaneously written to the second sub-pixel P2 and the third sub-pixel P3 through the representative data line RL; and an end moment of the second data signal D2 is preceded by a sixth time length T6 compared with an end moment of the effective scan period ET of the third scan signal SC3. The second data signal D2 and the third data signal D3 both last for a time length equal to the first time length T1, and the sixth time length T6 and the seventh time length T7 are both greater than zero. It is also possible to reduce the number of writing times, achieving a higher refresh rate.

The specific value of the second time length is not excessively limited. For example, referring to FIGS. 10, 11 and 12, the second time length T2 is equal to ½ of the first time length T1. As mentioned above, the first time length T1 may be ⅓ of the duration of the effective scan period ET of any scan signal SC, so a duration of the second time length T2 may be ⅙ of the duration of the effective scan period ET of any scan signal SC. The second data signal D2 and the third data signal D3 both last for the time length equal to the first time length T1, and the sixth time length T6 and the seventh time length T7 are both ½ of the first time length T1. Referring to FIGS. and 12, in the odd-numbered frame scan cycle, the start moment of the second data signal D2 is delayed by an eighth time length T8 compared with the start moment of the effective scan period ET of the second scan signal SC2. Referring to FIGS. 11 and 12, in the even-numbered frame scan cycle, the start moment of the third data signal D3 is delayed by a ninth time length T9 compared with the start moment of the effective scan period ET of the third scan signal SC3. The eighth time length T8 and the ninth time length T9 are both 2 times the first time length.

Referring to FIGS. 10, 11 and 12, the second time length T2 is equal to ½ of the first time length, and the gate line group GP includes a first gate line GL1, a second gate line GL2, a third gate line GL3 and a fourth gate line GL4, and multiple sub-pixels P coupled to multiple gate line GL in a gate line group GP further include a fourth sub-pixel P4 coupled to a representative data line RL and a fourth gate line GL4. A fourth data signal D4 is written to the fourth sub-pixel P4 through the representative data line RL, where the fourth data signal D4 is a data signal corresponding to pixel data for the fourth sub-pixel P4. The specific timing of the first data signal D1 and the fourth data signal D4 is not specifically limited. For example, the first data signal D1, the second data signal D2 and the fourth data signal D4 are last for a same time length, which is equal to the first time length T1. A duration of the time difference between a start moment of the first data signal D1 and the start moment of the effective scan period ET of the first scan signal SC1 is equal to 2 times the first time length T1; and a duration of the time difference between a start moment of the fourth data signal D4 and the start moment of the effective scan period ET of the fourth scan signal SC4 is also equal to 2 times the first time length T1. Referring to FIGS. 10 and 12, in the odd-numbered frame scan cycle, the start moment of the second data signal D2 is delayed by the eighth time length T8 compared with the start moment of the effective scan period ET of the second scan signal SC2, where the eighth time length T8 is equal to 2 times the second time length T8; and the end moment of the second data signal D2 is preceded by the sixth time length T6 compared with the end moment of the effective scan period ET of the third scan signal SC3, where the sixth time length T6 is ½ of the first time length T1. Referring to FIGS. 11 and 12, in the even-numbered frame scan cycle, a duration of the time difference between a start moment of the third data signal D3 and the start moment of the effective scan period ET of the second scan signal SC2 is equal to 2.5 times the first time length T1; an end moment of the third data signal D3 is delayed by the seventh time length T7 compared with the end moment of the effective scan period ET of the second scan signal SC2, where the seventh time length T7 is ½ of the first time length T1; and a start moment of the third data signal D3 is delayed by a ninth time length T9 compared with the start moment of the effective scan period ET of the third scan signal SC3, where the ninth time length T9 is 2 times the first time length T1.

According to the above settings, the data signal Data may be written to multiple sub-pixels P including the second sub-pixel P2 and the third sub-pixel P3 through only a writing process once. The number of times of writing the data signal Data is reduced, and accordingly, the total time length required for data writing is reduced, which is beneficial to further shortening a frame scan cycle and increasing the refresh rate.

Exemplarily, any two adjacent gate lines GL along the column direction in the first gate line group GL1 are divided into a preceding gate line GL and a subsequent gate line GL. The preceding gate line GL is arranged in a position before the subsequent gate line. That is, in a frame scan cycle, an effective scan period of a scan signal output by the scan drive circuit to the subsequent gate line is delayed by a non-zero time length compared with an effective scan period of a scan signal output by the scan drive circuit to the preceding gate line. For example, referring to FIG. 12, in the first gate line group GP1, the first gate line GL1 is located in a position before the second gate line GL2. Therefore, for the first gate line GL1 and the second gate line GL2, the first gate line GL1 is a preceding gate line, and the second gate line GL2 is a subsequent gate line. As another example, with continued reference to FIG. 12, in the first gate line group GP1, the second gate line GL2 is located in a position before the third gate line GL3. Therefore, for the second gate line GL2 and the third gate line GL3, the second gate line GL2 is a preceding gate line, and the third gate line GL3 is a subsequent gate line. The preceding gate line and the subsequent gate line are relative concepts and do not refer to specific gate lines.

A process of inputting a data signal to a sub-pixel is a charging process of a load capacitor formed by a pixel electrode and a common electrode in the sub-pixel. According to the charge quantity formula, $Q=I^2t$, it can be seen that the longer the charging time and the greater the charging current, the more the load capacitor is charged, so that after charging, a voltage of the load capacitor is the gray scale voltage (i.e., a voltage value enabling the sub-pixel to display a preset gray scale), the stronger the voltage holding ability of the sub-pixel will be. However, for the liquid crystal display apparatus, when the refresh rate of the liquid crystal display apparatus is high, the problem of insufficient charging of the load capacitor is likely to occur. In a case where each data line DL is configured to respectively write data signals to sub-pixels in at least one (e.g., three) sub-pixel row, it is possible to perform a writing of the data signal (i.e., charging) on multiple sub-pixels coupled to the preceding gate line while performing a pre-charging on multiple sub-pixels coupled to the subsequent gate line (i.e., writing data signals of the multiple sub-pixels coupled to the preceding gate line to the multiple sub-pixels coupled to the subsequent gate line, respectively), so that a voltage of a loading capacitor in each of the multiple sub-pixels coupled to the subsequent gate line is a pre-charging voltage.

Exemplarily, in a frame scan cycle, the data signals respectively written to the sub-pixels coupled to the preceding gate line each last for a time length partially overlapping with the effective scan period of the scan signal output by the scan drive circuit to the subsequent gate line. Exemplarily, the effective scan period of the scan signal output by the scan drive circuit to the preceding gate line partially overlaps with the effective scan period of the scan signal output by the scan drive circuit to the subsequent gate line, so that when a switch transistor corresponding to each sub-pixel coupled to the preceding gate line is turned on, a switch transistor corresponding to each sub-pixel coupled to the subsequent gate line is also turned on. Since the data signals respectively written to the sub-pixels coupled to the preceding gate line each last for a time length partially overlapping with the effective scan period of the scan signal output by the scan drive circuit to the subsequent gate line, while charging the load capacitor of each sub-pixel coupled to the preceding gate line, the data signals of the sub-pixels coupled to the preceding gate line can be respectively written to the sub-pixels coupled to the subsequent gate line, thereby pre-charging the load capacitor of each sub-pixel coupled to the subsequent gate line. In a frame scan cycle, the difference between a gray scale voltage and the pre-charge voltage of the sub-pixel at the current frame is less than the gray scale voltage of the sub-pixel at the current frame and a gray scale voltage of the sub-pixel at a previous frame, and therefore, pre-charging some pixels in the current frame shortens the time required for sub-pixels to reach the gray scale voltage, avoids the problem of under-charging of the load capacitor, and facilitates the increase of the refresh rate.

For example, referring to FIGS. 10 and 12, in a frame scan cycle, the effective scan period ET of the first scan signal SC1 and the effective scan period ET of the second scan signal SC2 partially overlap, and a data signal Data written to the first sub-pixel P1 lasts for a time length partially overlapping with the effective scan period ET of the second scan signal SC2, so that while the first sub-pixel P1 is being charged, the second sub-pixel P2 can be pre-charged, thereby shortening the charging time of the load capacitor corresponding to the second sub-pixel P2, which contributes to the improvement of the refresh rate.

As another example, referring to FIGS. 10, 11 and 12, as mentioned above, in a case where the gate line group GP further includes the fourth gate line GL4, the respective effective scan periods ET of the first scan signal SC1, the second scan signal SC2, the third scan signal SC3 and the fourth scan signal SC4 partially overlap, and the first data signal D1 lasts for a time length partially overlapping with an effective scan period ET of each of the second scan signal SC2, the third scan signal SC3 and the fourth scan signal SC4. That is, while a sub-pixel P coupled to the first gate line GL1 is charged, a corresponding sub-pixel P coupled to the second gate line GL2, a corresponding sub-pixel P coupled to the third gate line GL3 and a corresponding sub-pixel P coupled to the fourth gate line GL4 can be charged simultaneously, thereby shortening the time required for this four sub-pixels P to reach the gray scale voltage, resulting in a higher refresh rate and better display effect.

In a process of realizing image display by using the liquid crystal display apparatus, alternating current is usually used to drive liquid crystal molecules to avoid immobilization of their properties. Exemplarily, a data signal of the LCD apparatus changes positively and negatively by taking a common voltage (Vcom) as a reference. If a voltage of the data signal is greater than the common voltage, a driving signal is in a positive polarity, otherwise it is in a negative polarity. If a positive polarity data signal is written to a sub-pixel, the sub-pixel is in the positive polarity, and if a negative polarity data signal is written to a sub-pixel, the sub-pixel is in the negative polarity. For a same sub-pixel P, different luminous brightness will be produced when a data signal with different polarity is input thereto.

Exemplarily, referring to FIG. 12, the plurality of data lines DL include first data lines DL1 and second data lines DL2 which are alternately distributed along the row direction (i.e., the X direction). In a frame scan cycle, the data drive circuit is configured to output a first type of data signal to the first data line DL1 and a second type of data signal to the second data line DL, where the first type of data signal and the second type of data signal have different polarities. For example, referring to FIG. 3, the first data lines DL1 each output a first type of data signal, where the polarity of the first type of data signal is positive polarity, and the second data lines DL2 each output a second type of data signal, and the polarity of the second type of data signal is negative polarity.

The above-mentioned data signal Data input mode makes multiple sub-pixels P with the same color located in the same column (i.e., Y direction) have the same polarity, and among multiple sub-pixels P with the same color located in any two adjacent columns, the polarity of multiple sub-pixels P in one column is different from the polarity of multiple sub-pixels P in the other column, so that in a frame scan cycle, brightness of multiple columns of sub-pixels P with the same color but different polarities can be averaged in the row direction to achieve a uniform display brightness. As another example, referring to FIG. 4, the data line DL and the data signal Data transmitted thereby are set in a mode similar to the above. The above-mentioned data signal input mode causes multiple sub-pixels P with the same color located in the same column to have different polarities, and multiple sub-pixels P with the same color in the same row also have different polarities. In a frame scan cycle, the polarities of multiple sub-pixels P with the same color in the same row are positive, positive, negative and negative repeatedly arranged, and the polarities of multiple sub-pixels P with the same color in the same column are alternately arranged with positive and negative, so that a data signal input mode of column inversion can be used to achieve a display effect similar to point inversion. For multiple sub-pixels P with the same color, the brightness may be averaged in the row and column directions to achieve a better display effect.

If operating at a fixed voltage all the time, the properties of the liquid crystal molecules will be immobilized; and after the properties are immobilized, even if the fixed voltage is removed, the liquid crystal molecules can no longer respond to the change of the applied voltage to twist accordingly. Exemplarily, the liquid crystal display apparatus can be driven by driving methods such as row inversion, column inversion, and dot inversion to avoid the problem of the immobilization of physical properties of liquid crystal molecules, thereby achieving better display effects and extending the service life of the equipment. For example, a driving method of column inversion may be used, in which data signals output by the data drive circuit to the same data signal have different polarities in two adjacent frame scan cycles.

Some embodiments of the present disclosure provide a driving method for a display apparatus, and an executive body of the driving method may be the above-described display apparatus or a product including the above-described display apparatus. Referring to FIGS. 10, 11 and 12, the driving method includes: in a frame scan cycle, respectively outputting, by the scan drive circuit, scan signals SC to the multiple gate lines GL in the gate line group GP. Specifically, the scan drive circuit outputs the first scan signal to the first gate line, outputs the second scan signal to the second gate line, and outputs the third scan signal to the third gate line in sequence. A duration of an effective scan period ET of the first scan signal SC1, a duration of an effective scan period ET of the second scan signal SC2, and a duration of an effective scan period ET of the third scan signal are equal SC3; and a start moment of the effective scan period ET of the second scan signal SC2 is delayed by a first time length T1 compared with a start moment of the effective scan period ET of the first scan signal SC1, and a start moment of the effective scan period ET of the third scan signal SC3 is delayed by a second time length T2 compared with the start moment of the effective scan period ET of the second scan signal SC2, where the second time length T2 is less than the first time length T1. The magnitude of the first time length T1 is not specifically limited. Exemplarily, the first time length T1 may be equal to ⅓ of a duration that an effective scan period ET of any scan signal SC lasts. Similar to the foregoing, the driving method is equivalent to starting the effective scan period ET of the third scan signal SC3 the second time period T2 in advance, and the timing of scan signals SC sequentially output after the third scan signal SC3 is also advanced as a whole, so that when the row-by-row scanning is performed on the plurality of gate lines GL, the total time length required to complete a frame scan cycle is shorter, thereby facilitating the realization of a high refresh rate and achieving a good display effect.

Exemplarily, the specific time length (i.e., the second time length T2) by which the stat moment of the effective scan period ET of the third scan signal SC3 is advanced is not specifically limited. For example, the second time length T2 may be zero. As another example, the second time length T2 may be greater than 0 and less than or equal to ½ of the first time length T1. Similar to the setting of the display apparatus, the use of the driving method is similarly capable of achieving the purpose of increasing the refresh rate and improving the display effect.

Exemplarily, referring to FIGS. 10, 11 and 12, in a case where the display apparatus 1 further includes a data drive circuit and a plurality of data lines DL, the data drive circuit is coupled to the plurality of data lines DL and is configured to respectively output data signals Data to the plurality of data lines DL, the data line DL is configured to write a data signal Data to a sub-pixel P, and the data signal Data is pixel data for the sub-pixel P. The plurality of data lines include representative data lines RL. Multiple sub-pixels P coupled to multiple gate lines GL in a gate line group GP include: a first sub-pixel P1 coupled to a representative data line RL and a first gate line GL1, a second sub-pixel P2 coupled to the representative data line RL and a second gate line GL2, and a third sub-pixel P3 coupled to the representative data line RL and a third gate line GL3. The second sub-pixel P2 and the third sub-pixel P3 have a same color. In this case, the driving method for the display apparatus further includes: in a frame scan cycle, writing, by the data drive circuit, a first data signal D1 to the first sub-pixel P1 through the representative data line RL, and simultaneously writing, by the data drive circuit, a second data signal D2 or a third data signal D3 to the second sub-pixel P2 and the third sub-pixel P3 through the representative data line RL. The first data signal D1 is a data signal corresponding to pixel data for the first sub-pixel P1, the second data signal D2 is a data signal corresponding to pixel data for the second sub-pixel P2, and the third data signal D3 is a data signal corresponding to pixel data for the third sub-pixel P3. The representative data line RL is any data line DL among the plurality of data lines DL. According to the above driving method, the number of times of writing the data signal by the data drive circuit is reduced, and accordingly, the total time length required for data writing is reduced, which is beneficial to further shortening a frame scan cycle and increasing the refresh rate.

Exemplarily, referring to FIG. 12, the plurality of data lines DL include first data lines DL1 and second data lines DL2 which are alternately distributed along the row direction (i.e., the X direction). In a frame scan cycle, the data drive circuit outputs a first type of data signal to the first data line DL1 and outputs a second type of data signal to the second data line DL, where the first type of data signal and the second type of data signal have different polarities. This setting can make it possible to make the multiple columns of sub-pixels P with the same color but different polarities in the row direction and the column direction to be brightness averaged in the process of displaying an image in a frame, and the display brightness is more uniform, so as to achieve a better display effect.

Some embodiments of the present disclosure provide a computer-readable storage medium (e.g., a non-transitory computer-readable storage medium), the computer-readable storage medium stores therein computer program instructions that, when run on a processor, cause a computer (e.g., a liquid crystal display apparatus) to perform the method for driving the display apparatus according to any one of the embodiments above.

For example, the computer-readable storage medium may include, but is not limited to, a magnetic storage device (e.g., a hard disk, a floppy disk or a magnetic tape), an optical disk ((e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product. The computer program product includes computer program instructions that, when run on a computer (e.g., a liquid crystal display apparatus), cause the computer to perform the method for driving the display apparatus according to any one of the embodiments above.

Some embodiments of the present disclosure further provide a computer program. When the computer program is executed on the computer (e.g., a liquid crystal display apparatus), the computer program causes the computer to perform the method for driving the display apparatus according to any one of the embodiments above.

Beneficial effects of the computer-readable storage medium, the computer program product, and the computer program are the same as the beneficial effects of the method for driving the display apparatus described in the embodiments above, and will not be repeated here.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display apparatus, comprising:

a plurality of sub-pixels, arranged in an array;

at least one gate line group, wherein the gate line group includes multiple gate lines, and the multiple gate lines include a first gate line, a second gate line and a third gate line that are arranged sequentially along a column direction of the array; and a scan drive circuit, wherein the scan drive circuit is coupled to the multiple gate lines in the gate line group, and is configured to, in a frame scan cycle, respectively output scan signals to the multiple gate lines in the gate line group, which includes: outputting a first scan signal to the first gate line, outputting a second scan signal to the second gate line, and outputting a third scan signal to the third gate line in sequence;

wherein a duration of an effective scan period of the first scan signal, a duration of an effective scan period of the second scan signal, and a duration of an effective scan period of the third scan signal are equal; and a start moment of the effective scan period of the second scan signal is delayed by a first time length compared with a start moment of the effective scan period of the first scan signal, and a start moment of the effective scan period of the third scan signal is delayed by a second time length compared with the start moment of the effective scan period of the second scan signal; and the second time length is less than the first time length; wherein for scan signals respectively output by the scan drive circuit to any two adjacent gate lines in the gate line group, respective effective scan periods at least partially overlap with each other;

the at least one gate line group includes a first gate line group and a second gate line group that are arranged adjacent to each other along the column direction;

a start moment of an effective scan period of a first scan signal output from a first gate line in the second gate line group is delayed by a fourth time length compared with a start moment of an effective scan period of a fourth scan signal output from a fourth gate line in the first gate line group; and the fourth time length is equal to the first time length.

2. The display apparatus according to claim 1, wherein the second time length is zero.

3. The display apparatus according to claim 1, wherein the second time length is greater than 0 and less than or equal to ½ of the first time length.

4. The display apparatus according to claim 1, wherein the gate line group further includes a fourth gate line arranged adjacent to the third gate line along the column direction; and the scan drive circuit is further configured to output a fourth scan signal to the fourth gate line; a duration of an effective scan period of the fourth scan signal is equal to the duration of the effective scan period of the third scan signal, a start moment of the effective scan period of the fourth scan signal is delayed by a third time length compared with the start moment of the effective scan period of the third scan signal, and the third time length is equal to the first time length.

5. The display apparatus according to claim 4, wherein for the first scan signal and the fourth scan signal output by the scan drive circuit to the gate line group, respective effective scan periods at least partially overlap with each other.

6. The display apparatus according to claim 1, further comprising:

a data drive circuit and a plurality of data lines, wherein the data drive circuit is coupled to the plurality of data lines and is configured to respectively output data signals to the plurality of data lines, a data line is configured to write a data signal to a sub-pixel, and the data signal is pixel data for the sub-pixel;

the plurality of data lines include representative data lines;

multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line;

the second sub-pixel and the third sub-pixel have a same color; and the data drive circuit is configured to, in the frame scan cycle, write a first data signal to the first sub-pixel through the representative data line, and simultaneously write a second data signal or a third data signal to the second sub-pixel and the third sub-pixel through the representative data line; and the first data signal is a data signal corresponding to pixel data for the first sub-pixel, the second data signal is a data signal corresponding to pixel data for the second sub-pixel, and the third data signal is a data signal corresponding to pixel data for the third sub-pixel.

7. The display apparatus according to claim 6, wherein in the frame scan cycle, the second time length is zero;

the data drive circuit is configured to, in the frame scan cycle, simultaneously write the second data signal to the second sub-pixel and the third sub-pixel through the representative data line;

the second data signal lasts for a time length equal to the first time length;

a start moment of the second data signal is delayed by a fifth time length compared with the start moment of the effective scan period of the second scan signal; and the fifth time length is 2 times the first time length.

8. The display apparatus according to claim 6, wherein the second time length is greater than 0 and less than or equal to ½ of the first time length;

the data drive circuit is configured to, in an odd-numbered frame scan cycle, write the first data signal to the first sub-pixel through the representative data line, and simultaneously write the second data signal to the second sub-pixel and the third sub-pixel through the representative data line; and an end moment of the second data signal is preceded by a sixth time length compared with an end moment of the effective scan period of the third scan signal;

the data drive circuit is configured to, in an even-numbered frame scan cycle, write the first data signal to the first sub-pixel through the representative data line, and simultaneously write the third data signal to the second sub-pixel and the third sub-pixel through the representative data line; and an end moment of the third data signal is delayed by a seventh time length compared with an end moment of the effective scan period of the second scan signal;

the second data signal and the third data signal both last for a time length equal to the first time length; and the sixth time length and the seventh time length are both greater than 0.

9. The display apparatus according to claim 8, wherein the second time length is equal to ½ of the first time length;

the sixth time length and the seventh time length are both ½ of the first time length;

in the odd-numbered frame scan cycle, a start moment of the second data signal is delayed by an eighth time length compared with the start moment of the effective scan period of the second scan signal;

in the even-numbered frame scan cycle, a start moment of the third data signal is delayed by a ninth time length compared with the start moment of the effective scan period of the third scan signal; and the eighth time length and the ninth time length are both 2 times the first time length.

10. A display apparatus, comprising:

a plurality of sub-pixels, arranged in an array;

at least one gate line group, wherein the gate line group includes multiple gate lines, and the multiple gate lines include a first gate line, a second gate line and a third gate line that are arranged sequentially along a column direction of the array;

a scan drive circuit, wherein the scan drive circuit is coupled to the multiple gate lines in the gate line group, and is configured to, in a frame scan cycle, respectively output scan signals to the multiple gate lines in the gate line group, which includes: outputting a first scan signal to the first gate line, outputting a second scan signal to the second gate line, and outputting a third scan signal to the third gate line in sequence; and a data drive circuit and a plurality of data lines, wherein the data drive circuit is coupled to the plurality of data lines and is configured to respectively output data signals to the plurality of data lines, a data line is configured to write a data signal to a sub-pixel, and the data signal is pixel data for the sub-pixel;

the plurality of data lines include representative data lines;

multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line;

the second sub-pixel and the third sub-pixel have a same color; and the data drive circuit is configured to, in the frame scan cycle, write a first data signal to the first sub-pixel through the representative data line, and simultaneously write a second data signal or a third data signal to the second sub-pixel and the third sub-pixel through the representative data line; and the first data signal is a data signal corresponding to pixel data for the first sub-pixel, the second data signal is a data signal corresponding to pixel data for the second sub-pixel, and the third data signal is a data signal corresponding to pixel data for the third sub-pixel;

wherein a duration of an effective scan period of the first scan signal, a duration of an effective scan period of the second scan signal, and a duration of an effective scan period of the third scan signal are equal; and a start moment of the effective scan period of the second scan signal is delayed by a first time length compared with a start moment of the effective scan period of the first scan signal, and a start moment of the effective scan period of the third scan signal is delayed by a second time length compared with the start moment of the effective scan period of the second scan signal;

the second time length is less than the first time length;

for scan signals respectively output by the scan drive circuit to any two adjacent gate lines in the gate line group, respective effective scan periods at least partially overlap with each other;

any two adjacent gate lines in the first gate line group are divided into a preceding gate line and a subsequent gate line, and the preceding gate line is arranged at a side of the subsequent gate line facing the data drive circuit; and data signals respectively written to sub-pixels coupled to the preceding gate line each last for a time length partially overlapping with an effective scan period of a scan signal output by the scan drive circuit to the subsequent gate line.

11. The display apparatus according to claim 6, wherein the plurality of data lines include first data lines and second data lines that are alternately distributed along a row direction intersecting the column direction; and in the frame scan cycle, the data drive circuit is configured to, output a first type of data signal to the first data lines and a second type of data signal to the second data lines;

wherein the first type of data signal and the second type of data signal have different polarities.

12. A display apparatus, comprising:

a plurality of sub-pixels, arranged in an array;

at least one gate line group, wherein the gate line group includes multiple gate lines, and the multiple gate lines include a first gate line, a second gate line and a third gate line that are arranged sequentially along a column direction of the array;

a scan drive circuit, wherein the scan drive circuit is coupled to the multiple gate lines in the gate line group, and is configured to, in a frame scan cycle, respectively output scan signals to the multiple gate lines in the gate line group, which includes: outputting a first scan signal to the first gate line, outputting a second scan signal to the second gate line, and outputting a third scan signal to the third gate line in sequence; and a data drive circuit and a plurality of data lines, wherein the data drive circuit is coupled to the plurality of data lines and is configured to respectively output data signals to the plurality of data lines, a data line is configured to write a data signal to a sub-pixel, and the data signal is pixel data for the sub-pixel;

the plurality of data lines include representative data lines;

multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line;

the second sub-pixel and the third sub-pixel have a same color; and the data drive circuit is configured to, in the frame scan cycle, write a first data signal to the first sub-pixel through the representative data line, and simultaneously write a second data signal or a third data signal to the second sub-pixel and the third sub-pixel through the representative data line; and the first data signal is a data signal corresponding to pixel data for the first sub-pixel, the second data signal is a data signal corresponding to pixel data for the second sub-pixel, and the third data signal is a data signal corresponding to pixel data for the third sub-pixel;

wherein a data line is coupled to two sub-pixels in a same row, and the two sub-pixels coupled to the data line are respectively coupled to different gate lines;

a duration of an effective scan period of the first scan signal, a duration of an effective scan period of the second scan signal, and a duration of an effective scan period of the third scan signal are equal; and a start moment of the effective scan period of the second scan signal is delayed by a first time length compared with a start moment of the effective scan period of the first scan signal, and a start moment of the effective scan period of the third scan signal is delayed by a second time length compared with the start moment of the effective scan period of the second scan signal; and the second time length is less than the first time length.

13. The display apparatus according to claim 1, further comprising:

a timing control circuit, coupled to the scan drive circuit and configured to output multiple clock signals to the scan drive circuit;

wherein the scan drive circuit is further configured to, according to the multiple clock signals, respectively output the scan signals to the multiple gate lines.

14. A driving method for the display apparatus according to claim 1, the driving method comprising:

in the frame scan cycle, respectively outputting, by the scan drive circuit, the scan signals to the multiple gate lines in the gate line group, which includes: outputting the first scan signal to the first gate line, outputting the second scan signal to the second gate line, and outputting the third scan signal to the third gate line in sequence;

wherein the duration of the effective scan period of the first scan signal, the duration of the effective scan period of the second scan signal, and the duration of the effective scan period of the third scan signal are equal; and the start moment of the effective scan period of the second scan signal is delayed by the first time length compared with the start moment of the effective scan period of the first scan signal, and the start moment of the effective scan period of the third scan signal is delayed by the second time length compared with the start moment of the effective scan period of the second scan signal; and the second time length is less than the first time length; wherein for scan signals respectively output by the scan drive circuit to any two adjacent gate lines in the gate line group, respective effective scan periods at least partially overlap with each other;

the at least one gate line group includes a first gate line group and a second gate line group that are arranged adjacent to each other along the column direction;

a start moment of an effective scan period of a first scan signal output from a first gate line in the second gate line group is delayed by a fourth time length compared with a start moment of an effective scan period of a fourth scan signal output from a fourth gate line in the first gate line group; and the fourth time length is equal to the first time length.

15. The driving method according to claim 14, wherein the display apparatus further includes:

a data drive circuit and a plurality of data lines, wherein the data drive circuit is coupled to the plurality of data lines;

the driving method further comprises: respectively outputting, by the data drive circuit, data signals to the plurality of data lines, and writing, by a data line, a data signal to a sub-pixel, wherein the data signal is pixel data for the sub-pixel;

the plurality of data lines include representative data lines;

multiple sub-pixels coupled to multiple gate lines in a gate line group include: a first sub-pixel coupled to a representative data line and a first gate line, a second sub-pixel coupled to the representative data line and a second gate line, and a third sub-pixel coupled to the representative data line and a third gate line;

the second sub-pixel and the third sub-pixel have a same color; and the driving method further comprises: in the frame scan cycle, writing, by the data drive circuit, a first data signal to the first sub-pixel through the representative data line, and simultaneously writing, by the data drive circuit, a second data signal or a third data signal to the second sub-pixel and the third sub-pixel through the representative data line; wherein the first data signal is a data signal corresponding to pixel data for the first sub-pixel, the second data signal is a data signal corresponding to pixel data for the second sub-pixel, and the third data signal is a data signal corresponding to pixel data for the third sub-pixel.

16. The driving method according to claim 15, wherein the plurality of data lines include a first data line and a second data line arranged adjacent to each other along a row direction intersecting the column direction, and the driving method further comprises:

in the frame scan cycle, outputting, by the data drive circuit, a first type of data signal to the first data line and a second type of data signal to the second data line;

wherein the first type of data signal and the second type of data signal have different polarities.

17. The display apparatus according to claim 6, wherein in the frame scan cycle, the second time length is zero;

the data drive circuit is configured to, in the frame scan cycle, simultaneously write the third data signal to the second sub-pixel and the third sub-pixel through the representative data line;

the third data signal lasts for a time length equal to the first time length;

a start moment of the third data signal is delayed by a fifth time length compared with the start moment of the effective scan period of the second scan signal; and the fifth time length is 2 times the first time length.

18. The display apparatus according to claim 6, wherein the second time length is greater than 0 and less than or equal to ½ of the first time length;

the data drive circuit is configured to, in an odd-numbered frame scan cycle, write the first data signal to the first sub-pixel through the representative data line, and simultaneously write the third data signal to the second sub-pixel and the third sub-pixel through the representative data line; and an end moment of the third data signal is delayed by a seventh time length compared with an end moment of the effective scan period of the second scan signal;

the data drive circuit is configured to, in an even-numbered frame scan cycle, write the first data signal to the first sub-pixel through the representative data line, and simultaneously write the second data signal to the second sub-pixel and the third sub-pixel through the representative data line; and an end moment of the second data signal is preceded by a sixth time length compared with an end moment of the effective scan period of the third scan signal;

the second data signal and the third data signal both last for a time length equal to the first time length; and the sixth time length and the seventh time length are both greater than 0.

* * * * *